(12) United States Patent
Cariou et al.

(10) Patent No.: US 10,218,824 B2
(45) Date of Patent: Feb. 26, 2019

(54) APPARATUS, SYSTEM AND METHOD OF COMMUNICATING VIA A PLURALITY OF SECTORIZED ANTENNAS

(71) Applicant: INTEL IP CORPORATION, Santa Clara, CA (US)

(72) Inventors: Laurent Cariou, Portland, OR (US); Solomon B. Trainin, Haifa (IL); Ou Yang, Santa Clara, CA (US); Carlos Cordeiro, Portland, OR (US)

(73) Assignee: INTEL IP CORPORATION, Santa Clara, CA (US)

( * ) Notice: Subject to any disclaimer, the term of this patent is extended or adjusted under 35 U.S.C. 154(b) by 219 days.

(21) Appl. No.: 15/199,615

(22) Filed: Jun. 30, 2016

(65) Prior Publication Data

US 2018/0006705 A1    Jan. 4, 2018

(51) Int. Cl.
*H04B 7/06* (2006.01)
*H04L 29/06* (2006.01)
*H04W 88/08* (2009.01)

(52) U.S. Cl.
CPC .......... *H04L 69/28* (2013.01); *H04B 7/0695* (2013.01); *H04W 88/08* (2013.01)

(58) Field of Classification Search
CPC ................................ H04B 7/0684; H04B 7/04
See application file for complete search history.

(56) References Cited

U.S. PATENT DOCUMENTS

| 2017/0054470 | A1* | 2/2017 | Reza | H04B 1/44 |
| 2017/0134076 | A1* | 5/2017 | Maamari | H04B 7/0452 |
| 2017/0207839 | A1* | 7/2017 | Eitan | H04B 7/0617 |

OTHER PUBLICATIONS

IEEE Std 802.11™—2012. IEEE Standard for Information technology—Telecommunications and information exchange between systems Local and metropolitan area networks—Specific requirements Part 11: Wireless LAN Medium Access Control (MAC) and Physical Layer (PHY) Specifications, Mar. 29, 2012, 2793 pages.

(Continued)

*Primary Examiner* — Rhonda L Murphy
(74) *Attorney, Agent, or Firm* — Shichrur & Co.

(57) ABSTRACT

For example, a first wireless station may be configured to, during a first beamforming training with a second wireless station, communicate one or more first frames with the second wireless station via a first sectorized antenna of a plurality of sectorized antennas of the first wireless station, the first frames including a first Identifier (ID) of the first sectorized antenna, to communicate one or more beamformed transmissions with the second wireless station based on the first beamforming training; and to communicate a second frame with the second wireless station via a second sectorized antenna of the plurality of sectorized antennas of the first wireless station, the second frame to initiate a second beamforming training between the second sectorized antenna and the second wireless station, the second frame including a second ID of the second sectorized antenna.

25 Claims, 6 Drawing Sheets

(56) References Cited

OTHER PUBLICATIONS

IEEE Std 802.11ad™—2012. IEEE Standard for Information technology—Telecommunications and information exchange between systems Local and metropolitan area networks—Specific requirements Part 11: Wireless LAN Medium Access Control (MAC) and Physical Layer (PHY) Specifications Amendment 3: Enhancements for Very High Throughput in the 60 GHz Band, Dec. 28, 2012, 628 pages.

IEEE Std 802.11ac™—2013. IEEE Standard for Information technology—Telecommunications and information exchange between systems Local and metropolitan area networks—Specific requirements, Part 11: Wireless LAN Medium Access Control (MAC) and Physical Layer (PHY) Specifications, Amendment 4: Enhancements for Very High Throughput for Operation in Bands below 6 GHz, Dec. 11, 2013, 424 pages.

* cited by examiner

APPARATUS, SYSTEM AND METHOD OF COMMUNICATING VIA A PLURALITY OF SECTORIZED ANTENNAS

TECHNICAL FIELD

Embodiments described herein generally relate to communicating via a plurality of sectorized antennas.

BACKGROUND

A wireless communication network in a millimeter-wave band may provide high-speed data access for users of wireless communication devices.

Some Specifications may be configured to support a Multi User (MU) system, in which an Access Point (AP) simultaneously transmits frames to a plurality of stations.

BRIEF DESCRIPTION OF THE DRAWINGS

For simplicity and clarity of illustration, elements shown in the figures have not necessarily been drawn to scale. For example, the dimensions of some of the elements may be exaggerated relative to other elements for clarity of presentation. Furthermore, reference numerals may be repeated among the figures to indicate corresponding or analogous elements. The figures are listed below.

DETAILED DESCRIPTION

Figure 1:
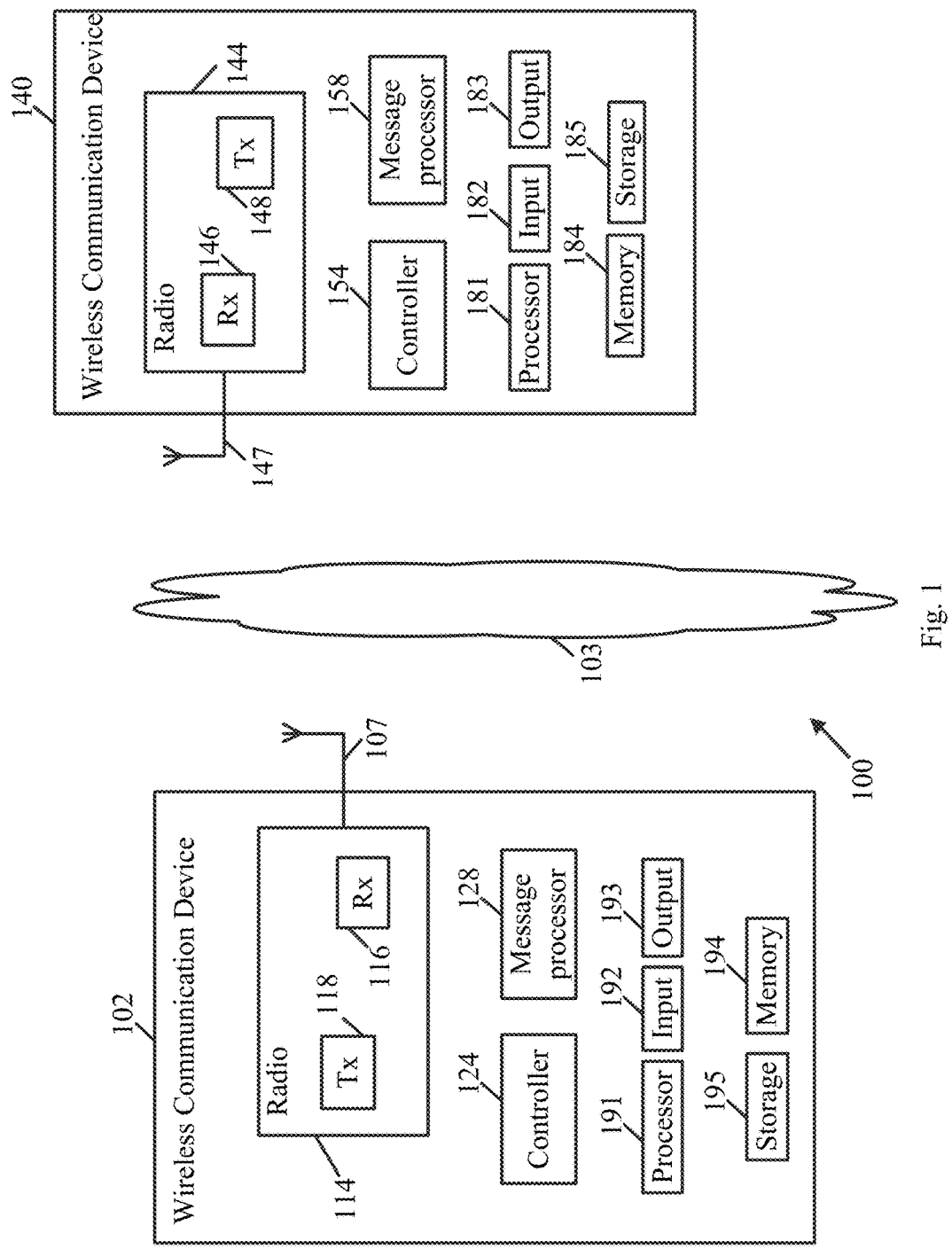
FIG. 1 is a schematic block diagram illustration of a system, in accordance with some demonstrative embodiments.

In the following detailed description, numerous specific details are set forth in order to provide a thorough understanding of some embodiments. However, it will be understood by persons of ordinary skill in the art that some embodiments may be practiced without these specific details. In other instances, well-known methods, procedures, components, units and/or circuits have not been described in detail so as not to obscure the discussion.

Discussions herein utilizing terms such as, for example, "processing", "computing", "calculating", "determining", "establishing", "analyzing", "checking", or the like, may refer to operation(s) and/or process(es) of a computer, a computing platform, a computing system, or other electronic computing device, that manipulate and/or transform data represented as physical (e.g., electronic) quantities within the computer's registers and/or memories into other data similarly represented as physical quantities within the computer's registers and/or memories or other information storage medium that may store instructions to perform operations and/or processes.

The terms "plurality" and "a plurality", as used herein, include, for example, "multiple" or "two or more". For example, "a plurality of items" includes two or more items.

References to "one embodiment", "an embodiment", "demonstrative embodiment", "various embodiments" etc., indicate that the embodiment(s) so described may include a particular feature, structure, or characteristic, but not every embodiment necessarily includes the particular feature, structure, or characteristic. Further, repeated use of the phrase "in one embodiment" does not necessarily refer to the same embodiment, although it may.

As used herein, unless otherwise specified the use of the ordinal adjectives "first", "second", "third" etc., to describe a common object, merely indicate that different instances of like objects are being referred to, and are not intended to imply that the objects so described must be in a given sequence, either temporally, spatially, in ranking, or in any other manner.

Some embodiments may be used in conjunction with various devices and systems, for example, a User Equipment (UE), a Mobile Device (MD), a wireless station (STA), a Personal Computer (PC), a desktop computer, a mobile computer, a laptop computer, a notebook computer, a tablet computer, a server computer, a handheld computer, a handheld device, a wearable device, a sensor device, an Internet of Things (IoT) device, a Personal Digital Assistant (PDA) device, a handheld PDA device, an on-board device, an off-board device, a hybrid device, a vehicular device, a non-vehicular device, a mobile or portable device, a consumer device, a non-mobile or non-portable device, a wireless communication station, a wireless communication device, a wireless Access Point (AP), a wired or wireless router, a wired or wireless modem, a video device, an audio device, an audio-video (A/V) device, a wired or wireless network, a wireless area network, a Wireless Video Area Network (WVAN), a Local Area Network (LAN), a Wireless LAN (WLAN), a Personal Area Network (PAN), a Wireless PAN (WPAN), and the like.

Some embodiments may be used in conjunction with devices and/or networks operating in accordance with existing IEEE 802.11 standards (including IEEE 802.11-2012 (IEEE 802.11-2012, *IEEE Standard for Information technology—Telecommunications and information exchange between systems Local and metropolitan area networks—Specific requirements Part 11: Wireless LAN Medium Access Control (MAC) and Physical Layer (PHY) Specifications, Mar. 29, 2012*); IEEE802.11ac-2013 ("*IEEE P802.11ac-2013, IEEE Standard for Information Technology—Telecommunications and Information Exchange Between Systems—Local and Metropolitan Area Networks—Specific Requirements—Part 11: Wireless LAN Medium Access Control (MAC) and Physical Layer (PHY) Specifications—Amendment 4: Enhancements for Very High Throughput for Operation in Bands below 6 GHz*", December 2013); IEEE 802.11ad ("*IEEE P802.11ad-2012, IEEE Standard for Information Technology—Telecommunications and Information Exchange Between Systems—Local and Metropolitan Area Networks—Specific Requirements—Part 11: Wireless LAN Medium Access Control (MAC) and Physical Layer (PHY) Specifications—Amendment 3: Enhancements for Very High Throughput in the 60 GHz Band*", 28 Dec. 2012); IEEE-802.11REVmc ("*IEEE 802.11-REVmcTM/D3.0, June 2014 draft standard for Information technology—Telecommunications and information exchange between systems Local and metropolitan area networks Specific requirements; Part 11: *Wireless LAN Medium Access Control (MAC) and Physical Layer (PHY) Specification*"); IEEE 802.11ax (*IEEE 802.11ax, High Efficiency WLAN (HEW)*); IEEE802.11-ay (*P802.11ay Standard for Information Technology—Telecommunications and Information Exchange Between Systems Local and Metropolitan Area Networks—Specific Requirements Part* 11: *Wireless LAN Medium Access Control (MAC) and Physical Layer (PHY) Specifications—Amendment: Enhanced Throughput for Operation in License-Exempt Bands Above* 45 *GHz*)) and/or future versions and/or derivatives thereof) and/or future versions and/or derivatives thereof, devices and/or networks operating in accordance with existing Wireless-Gigabit-Alliance (WGA) specifications (*Wireless Gigabit Alliance, Inc WiGig MAC and PHY Specification Version* 1.1, *April* 2011, *Final specification*) and/or future versions and/or derivatives thereof, devices and/or networks operating in accordance with existing Wireless Fidelity (WiFi) Alliance (WFA) Peer-to-Peer (P2P) specifications (*WiFi P2P technical specification, version* 1.5, *Aug.* 4, 2014) and/or future versions and/or derivatives thereof, devices and/or networks operating in accordance with existing cellular specifications and/or protocols, e.g., 3rd Generation Partnership Project (3GPP), 3GPP Long Term Evolution (LTE) and/or future versions and/or derivatives thereof, devices and/or networks operating in accordance with existing Bluetooth (BT) specifications and/or protocols and/or future versions and/or derivatives thereof, units and/or devices which are part of the above networks, and the like.

Some embodiments may be used in conjunction with one way and/or two-way radio communication systems, cellular radio-telephone communication systems, a mobile phone, a cellular telephone, a wireless telephone, a Personal Communication Systems (PCS) device, a PDA device which incorporates a wireless communication device, a mobile or portable Global Positioning System (GPS) device, a device which incorporates a GPS receiver or transceiver or chip, a device which incorporates an RFID element or chip, a Multiple Input Multiple Output (MIMO) transceiver or device, a Single Input Multiple Output (SIMO) transceiver or device, a Multiple Input Single Output (MISO) transceiver or device, a device having one or more internal antennas and/or external antennas, Digital Video Broadcast (DVB) devices or systems, multi-standard radio devices or systems, a wired or wireless handheld device, e.g., a Smartphone, a Wireless Application Protocol (WAP) device, or the like.

Some embodiments may be used in conjunction with one or more types of wireless communication signals and/or systems, for example, Radio Frequency (RF), Infra Red (IR), Frequency-Division Multiplexing (FDM), Orthogonal FDM (OFDM), Orthogonal Frequency-Division Multiple Access (OFDMA), FDM Time-Division Multiplexing (TDM), Time-Division Multiple Access (TDMA), Multi-User MIMO (MU-MIMO), Spatial Division Multiple Access (SDMA), Extended TDMA (E-TDMA), General Packet Radio Service (GPRS), extended GPRS, Code-Division Multiple Access (CDMA), Wideband CDMA (WCDMA), CDMA 2000, single-carrier CDMA, multi-carrier CDMA, Multi-Carrier Modulation (MDM), Discrete Multi-Tone (DMT), Bluetooth®, Global Positioning System (GPS), Wi-Fi, Wi-Max, ZigBeeTM, Ultra-Wideband (UWB), Global System for Mobile communication (GSM), 2G, 2.5G, 3G, 3.5G, 4G, Fifth Generation (5G), or Sixth Generation (6G) mobile networks, 3GPP, Long Term Evolution (LTE), LTE advanced, Enhanced Data rates for GSM Evolution (EDGE), or the like. Other embodiments may be used in various other devices, systems and/or networks.

The term "wireless device", as used herein, includes, for example, a device capable of wireless communication, a communication device capable of wireless communication, a communication station capable of wireless communication, a portable or non-portable device capable of wireless communication, or the like. In some demonstrative embodiments, a wireless device may be or may include a peripheral that is integrated with a computer, or a peripheral that is attached to a computer. In some demonstrative embodiments, the term "wireless device" may optionally include a wireless service.

The term "communicating" as used herein with respect to a communication signal includes transmitting the communication signal and/or receiving the communication signal. For example, a communication unit, which is capable of communicating a communication signal, may include a transmitter to transmit the communication signal to at least one other communication unit, and/or a communication receiver to receive the communication signal from at least one other communication unit. The verb communicating may be used to refer to the action of transmitting or the action of receiving. In one example, the phrase "communicating a signal" may refer to the action of transmitting the signal by a first device, and may not necessarily include the action of receiving the signal by a second device. In another example, the phrase "communicating a signal" may refer to the action of receiving the signal by a first device, and may not necessarily include the action of transmitting the signal by a second device.

As used herein, the term "circuitry" may refer to, be part of, or include, an Application Specific Integrated Circuit (ASIC), an integrated circuit, an electronic circuit, a processor (shared, d, or group), and/or memory (shared, dedicated, dedicate or group), that execute one or more software or firmware programs, a combinational logic circuit, and/or other suitable hardware components that provide the described functionality. In some embodiments, the circuitry may be implemented in, or functions associated with the circuitry may be implemented by, one or more software or firmware modules. In some embodiments, circuitry may include logic, at least partially operable in hardware.

The term "logic" may refer, for example, to computing logic embedded in circuitry of a computing apparatus and/or computing logic stored in a memory of a computing apparatus. For example, the logic may be accessible by a processor of the computing apparatus to execute the computing logic to perform computing functions and/or operations. In one example, logic may be embedded in various types of memory and/or firmware, e.g., silicon blocks of various chips and/or processors. Logic may be included in, and/or implemented as part of, various circuitry, e.g. radio circuitry, receiver circuitry, control circuitry, transmitter circuitry, transceiver circuitry, processor circuitry, and/or the like. In one example, logic may be embedded in volatile memory and/or non-volatile memory, including random access memory, read only memory, programmable memory, magnetic memory, flash memory, persistent memory, and the like. Logic may be executed by one or more processors using memory, e.g., registers, stuck, buffers, and/or the like, coupled to the one or more processors, e.g., as necessary to execute the logic.

Some demonstrative embodiments may be used in conjunction with a WLAN, e.g., a WiFi network. Other embodiments may be used in conjunction with any other suitable wireless communication network, for example, a wireless area network, a "piconet", a WPAN, a WVAN and the like.

Some demonstrative embodiments may be used in conjunction with a wireless communication network communicating over a frequency band of 60 GHz. However, other embodiments may be implemented utilizing any other suitable wireless communication frequency bands, for example, an Extremely High Frequency (EHF) band (the millimeter wave (mmWave) frequency band), e.g., a frequency band within the frequency band of between 20 Ghz and 300 GHZ, a frequency band above 45 GHZ, a frequency band below 20 GHZ, e.g., a Sub 1 GHZ (S1G) band, a 2.4 GHz band, a 5 GHZ band, a WLAN frequency band, a WPAN frequency band, a frequency band according to the WGA specification, and the like.

The term "antenna", as used herein, may include any suitable configuration, structure and/or arrangement of one or more antenna elements, components, units, assemblies and/or arrays. In some embodiments, the antenna may implement transmit and receive functionalities using separate transmit and receive antenna elements. In some embodiments, the antenna may implement transmit and receive functionalities using common and/or integrated transmit/receive elements. The antenna may include, for example, a phased array antenna, a single element antenna, a set of switched beam antennas, and/or the like.

The phrases "directional multi-gigabit (DMG)" and "directional band" (DBand), as used herein, may relate to a frequency band wherein the Channel starting frequency is above 45 GHz. In one example, DMG communications may involve one or more directional links to communicate at a rate of multiple gigabits per second, for example, at least 1 Gigabit per second, e.g., 7 Gigabit per second, or any other rate.

Some demonstrative embodiments may be implemented by a DMG STA (also referred to as a "mmWave STA (mSTA)"), which may include for example, a STA having a radio transmitter, which is capable of operating on a channel that is within the DMG band. The DMG STA may perform other additional or alternative functionality. Other embodiments may be implemented by any other apparatus, device and/or station.

Reference is made to FIG. 1, which schematically illustrates a system 100, in accordance with some demonstrative embodiments.

As shown in FIG. 1, in some demonstrative embodiments, system 100 may include one or more wireless communication devices. For example, system 100 may include a first wireless communication device 102, and/or a second wireless communication device 140.

In some demonstrative embodiments, devices 102 and/or 140 may include a mobile device or a non-mobile, e.g., a static, device.

For example, devices 102 and/or 140 may include, for example, a UE, an MD, a STA, an AP, a PC, a desktop computer, a mobile computer, a laptop computer, an Ultrabook™ computer, a notebook computer, a tablet computer, a server computer, a handheld computer, an Internet of Things (IoT) device, a sensor device, a handheld device, a wearable device, a PDA device, a handheld PDA device, an on-board device, an off-board device, a hybrid device (e.g., combining cellular phone functionalities with PDA device functionalities), a consumer device, a vehicular device, a non-vehicular device, a mobile or portable device, a non-mobile or non-portable device, a mobile phone, a cellular telephone, a PCS device, a PDA device which incorporates a wireless communication device, a mobile or portable GPS device, a DVB device, a relatively small computing device, a non-desktop computer, a "Carry Small Live Large" (CSLL) device, an Ultra Mobile Device (UMD), an Ultra Mobile PC (UMPC), a Mobile Internet Device (MID), an "Origami" device or computing device, a device that supports Dynamically Composable Computing (DCC), a context-aware device, a video device, an audio device, an A/V device, a Set-Top-Box (STB), a Blu-ray disc (BD) player, a BD recorder, a Digital Video Disc (DVD) player, a High Definition (HD) DVD player, a DVD recorder, a HD DVD recorder, a Personal Video Recorder (PVR), a broadcast HD receiver, a video source, an audio source, a video sink, an audio sink, a stereo tuner, a broadcast radio receiver, a flat panel display, a Personal Media Player (PMP), a digital video camera (DVC), a digital audio player, a speaker, an audio receiver, an audio amplifier, a gaming device, a data source, a data sink, a Digital Still camera (DSC), a media player, a Smartphone, a television, a music player, or the like.

In some demonstrative embodiments, device 102 may include, for example, one or more of a processor 191, an input unit 192, an output unit 193, a memory unit 194, and/or a storage unit 195; and/or device 140 may include, for example, one or more of a processor 181, an input unit 182, an output unit 183, a memory unit 184, and/or a storage unit 185. Devices 102 and/or 140 may optionally include other suitable hardware components and/or software components. In some demonstrative embodiments, some or all of the components of one or more of devices 102 and/or 140 may be enclosed in a common housing or packaging, and may be interconnected or operably associated using one or more wired or wireless links. In other embodiments, components of one or more of devices 102 and/or 140 may be distributed among multiple or separate devices.

In some demonstrative embodiments, processor 191 and/or processor 181 may include, for example, a Central Processing Unit (CPU), a Digital Signal Processor (DSP), one or more processor cores, a single-core processor, a dual-core processor, a multiple-core processor, a microprocessor, a host processor, a controller, a plurality of processors or controllers, a chip, a microchip, one or more circuits, circuitry, a logic unit, an Integrated Circuit (IC), an Application-Specific IC (ASIC), or any other suitable multipurpose or specific processor or controller. Processor 191 may execute instructions, for example, of an Operating System (OS) of device 102 and/or of one or more suitable applications. Processor 181 may execute instructions, for example, of an Operating System (OS) of device 140 and/or of one or more suitable applications.

In some demonstrative embodiments, input unit 192 and/or input unit 182 may include, for example, a keyboard, a keypad, a mouse, a touch-screen, a touch-pad, a track-ball, a stylus, a microphone, or other suitable pointing device or input device. Output unit 193 and/or output unit 183 may include, for example, a monitor, a screen, a touch-screen, a flat panel display, a Light Emitting Diode (LED) display unit, a Liquid Crystal Display (LCD) display unit, a plasma display unit, one or more audio speakers or earphones, or other suitable output devices.

In some demonstrative embodiments, memory unit 194 and/or memory unit 184 includes, for example, a Random Access Memory (RAM), a Read Only Memory (ROM), a Dynamic RAM (DRAM), a Synchronous DRAM (SDRAM), a flash memory, a volatile memory, a non-volatile memory, a cache memory, a buffer, a short term memory unit, a long term memory unit, or other suitable memory units. Storage unit 195 and/or storage unit 185 may include, for example, a hard disk drive, a floppy disk drive, a Compact Disk (CD) drive, a CD-ROM drive, a DVD drive, or other suitable removable or non-removable storage units. Memory unit 194 and/or storage unit 195, for example, may store data processed by device 102. Memory unit 184 and/or storage unit 185, for example, may store data processed by device 140.

In some demonstrative embodiments, device 102 and/or device 140 may include and/or perform the functionality of one or more STAs. For example, device 102 may include at least one STA, and/or device 140 may include at least one STA.

In some demonstrative embodiments, device 102 and/or device 140 may include, operate as, and/or perform the functionality of one or more DMG STAs. For example, device 102 may include, operate as, and/or perform the functionality of, at least one DMG STA, and/or device 140 may include, operate as, and/or perform the functionality of, at least one DMG STA.

In other embodiments, devices 102 and/or 140 may operate as and/or perform one or more functionalities of any other wireless device and/or station, e.g., a WLAN STA, a WiFi STA, and the like.

In some demonstrative embodiments, device 102 and/or device 140 may be configured to operate as, perform a role of, and/or perform the functionality of, an access point (AP), e.g., a DMG AP, and/or a personal basic service set (PBSS) control point (PCP), e.g., a DMG PCP, for example, an AP/PCP STA, e.g., a DMG AP/PCP STA.

In some demonstrative embodiments, device 102 and/or device 140 may be configured to operate as, perform a role of, and/or perform the functionality of, a non-AP STA, e.g., a DMG non-AP STA, and/or a non-PCP STA, e.g., a DMG non-PCP STA, for example, a non-AP/PCP STA, e.g., a DMG non-AP/PCP STA.

In other embodiments, device 102 and/or device 140 may operate as, perform a role of, and/or perform one or more functionalities of, any other additional or alternative device and/or station.

In one example, a station (STA) may include a logical entity that is a singly addressable instance of a medium access control (MAC) and physical layer (PHY) interface to the wireless medium (WM). The STA may perform any other additional or alternative functionality.

In one example, an AP may include an entity that contains a station (STA), e.g., one STA, and provides access to distribution services, via the wireless medium (WM) for associated STAs. The AP may perform any other additional or alternative functionality.

In one example, a personal basic service set (PBSS) control point (PCP) may include an entity that contains a STA, e.g., one station (STA), and coordinates access to the wireless medium (WM) by STAs that are members of a PBSS. The PCP may perform any other additional or alternative functionality.

In one example, a PBSS may include a directional multi-gigabit (DMG) basic service set (BSS) that includes, for example, one PBSS control point (PCP). For example, access to a distribution system (DS) may not be present, but, for example, an intra-PBSS forwarding service may optionally be present.

In one example, a PCP/AP STA may include a station (STA) that is at least one of a PCP or an AP. The PCP/AP STA may perform any other additional or alternative functionality.

In one example, a non-AP STA may include a STA that is not contained within an AP. The non-AP STA may perform any other additional or alternative functionality.

In one example, a non-PCP STA may include a STA that is not a PCP. The non-PCP STA may perform any other additional or alternative functionality.

In one example, a non PCP/AP STA may include a STA that is not a PCP and that is not an AP. The non-PCP/AP STA may perform any other additional or alternative functionality.

In some demonstrative embodiments, wireless communication device 102 and/or device 140 may be capable of communicating content, data, information and/or signals via a wireless medium (WM) 103. In some demonstrative embodiments, wireless medium 103 may include, for example, a radio channel, a cellular channel, an RF channel, a WiFi channel, an IR channel, a Bluetooth (BT) channel, a Global Navigation Satellite System (GNSS) Channel, and the like.

In some demonstrative embodiments, WM 103 may include one or more directional bands and/or channels. For example, WM 103 may include one or more millimeter-wave (mmWave) wireless communication bands and/or channels.

In some demonstrative embodiments, WM 103 may include one or more DMG channels. In other embodiments, WM 103 may include any other directional channels.

In some demonstrative embodiments, device 102 and/or device 140 may include one or more radios including circuitry and/or logic to perform wireless communication between devices 102, 140 and/or one or more other wireless communication devices. For example, device 102 may include at least one radio 114, and/or device 140 may include at least one radio 144.

In some demonstrative embodiments, radio 114 and/or radio 144 may include one or more wireless receivers (Rx) including circuitry and/or logic to receive wireless communication signals, RF signals, frames, blocks, transmission streams, packets, messages, data items, and/or data. For example, radio 114 may include at least one receiver 116, and/or radio 144 may include at least one receiver 146.

In some demonstrative embodiments, radio 114 and/or radio 144 may include one or more wireless transmitters (Tx) including circuitry and/or logic to transmit wireless communication signals, RF signals, frames, blocks, transmission streams, packets, messages, data items, and/or data. For example, radio 114 may include at least one transmitter 118, and/or radio 144 may include at least one transmitter 148.

In some demonstrative embodiments, radio 114 and/or radio 144, transmitters 118 and/or 148, and/or receivers 116 and/or 146 may include circuitry; logic; Radio Frequency (RF) elements, circuitry and/or logic; baseband elements, circuitry and/or logic; modulation elements, circuitry and/or logic; demodulation elements, circuitry and/or logic; amplifiers; analog to digital and/or digital to analog converters; filters; and/or the like. For example, radio 114 and/or radio 144 may include or may be implemented as part of a wireless Network Interface Card (NIC), and the like.

In some demonstrative embodiments, radios 114 and/or 144 may be configured to communicate over a directional band, for example, a mmWave band, and/or any other band, for example, a 2.4 GHz band, a 5 GHz band, a S1G band, and/or any other band.

In some demonstrative embodiments, radio 114 and/or radio 144 may include, or may be associated with, one or more antennas 107 and/or 147, respectively.

In one example, device 102 may include a single antenna 107. In another example, device 102 may include two or more antennas 107.

In one example, device 140 may include a single antenna 147. In another example, device 140 may include two or more antennas 147.

Antennas 107 and/or 147 may include any type of antennas suitable for transmitting and/or receiving wireless communication signals, blocks, frames, transmission streams, packets, messages and/or data. For example, antennas 107 and/or 147 may include any suitable configuration, structure and/or arrangement of one or more antenna elements, components, units, assemblies and/or arrays. Antennas 107 and/or 147 may include, for example, antennas suitable for directional communication, e.g., using beamforming techniques. For example, antennas 107 and/or 147 may include a phased array antenna, a multiple element antenna, a set of switched beam antennas, and/or the like. In some embodiments, antennas 107 and/or 147 may implement transmit and receive functionalities using separate transmit and receive antenna elements. In some embodiments, antennas 107 and/or 147 may implement transmit and receive functionalities using common and/or integrated transmit/receive elements.

In some demonstrative embodiments, antennas 107 and/or 147 may include a directional antenna, which may be configured to be steered to a plurality of beam directions.

In some demonstrative embodiments, device 102 may include a controller 124, and/or device 140 may include a controller 154. Controllers 124 and/or 154 may be configured to perform one or more communications, may generate and/or communicate one or more messages and/or transmissions, and/or may perform one or more functionalities, operations and/or procedures between devices 102, 140 and/or one or more other devices, e.g., as described below.

In some demonstrative embodiments, controllers 124 and/or 154 may include circuitry and/or logic, e.g., one or more processors including circuitry and/or logic, memory circuitry and/or logic, Media-Access Control (MAC) circuitry and/or logic, Physical Layer (PHY) circuitry and/or logic, and/or any other circuitry and/or logic, configured to perform the functionality of controllers 124 and/or 154, respectively. Additionally or alternatively, one or more functionalities of controllers 124 and/or 154 may be implemented by logic, which may be executed by a machine and/or one or more processors, e.g., as described below.

In one example, controller 124 may include circuitry and/or logic, for example, one or more processors including circuitry and/or logic, to cause, trigger and/or control a wireless device, e.g., device 102, and/or a wireless station, e.g., a wireless STA implemented by device 102, to perform one or more operations, communications and/or functionalities, e.g., as described herein.

In one example, controller 154 may include circuitry and/or logic, for example, one or more processors including circuitry and/or logic, to cause, trigger and/or control a wireless device, e.g., device 140, and/or a wireless station, e.g., a wireless STA implemented by device 140, to perform one or more operations, communications and/or functionalities, e.g., as described herein.

In some demonstrative embodiments, device 102 may include a message processor 128 configured to generate, process and/or access one or messages communicated by device 102.

In one example, message processor 128 may be configured to generate one or more messages to be transmitted by device 102, and/or message processor 128 may be configured to access and/or to process one or more messages received by device 102, e.g., as described below.

In some demonstrative embodiments, device 140 may include a message processor 158 configured to generate, process and/or access one or messages communicated by device 140.

In one example, message processor 158 may be configured to generate one or more messages to be transmitted by device 140, and/or message processor 158 may be configured to access and/or to process one or more messages received by device 140, e.g., as described below.

In some demonstrative embodiments, message processors 128 and/or 158 may include circuitry and/or logic, e.g., one or more processors including circuitry and/or logic, memory circuitry and/or logic, Media-Access Control (MAC) circuitry and/or logic, Physical Layer (PHY) circuitry and/or logic, and/or any other circuitry and/or logic, configured to perform the functionality of message processors 128 and/or 158, respectively. Additionally or alternatively, one or more functionalities of message processors 128 and/or 158 may be implemented by logic, which may be executed by a machine and/or one or more processors, e.g., as described below.

In some demonstrative embodiments, at least part of the functionality of message processor 128 may be implemented as part of radio 114, and/or at least part of the functionality of message processor 158 may be implemented as part of radio 144.

In some demonstrative embodiments, at least part of the functionality of message processor 128 may be implemented as part of controller 124, and/or at least part of the functionality of message processor 158 may be implemented as part of controller 154.

In other embodiments, the functionality of message processor 128 may be implemented as part of any other element of device 102, and/or the functionality of message processor 158 may be implemented as part of any other element of device 140.

In some demonstrative embodiments, at least part of the functionality of controller 124 and/or message processor 128 may be implemented by an integrated circuit, for example, a chip, e.g., a System on Chip (SoC). In one example, the chip or SoC may be configured to perform one or more functionalities of radio 114. For example, the chip or SoC may include one or more elements of controller 124, one or more elements of message processor 128, and/or one or more elements of radio 114. In one example, controller 124, message processor 128, and radio 114 may be implemented as part of the chip or SoC.

In other embodiments, controller 124, message processor 128 and/or radio 114 may be implemented by one or more additional or alternative elements of device 102.

In some demonstrative embodiments, at least part of the functionality of controller 154 and/or message processor 158 may be implemented by an integrated circuit, for example, a chip, e.g., a System on Chip (SoC). In one example, the chip or SoC may be configured to perform one or more functionalities of radio 144. For example, the chip or SoC may include one or more elements of controller 154, one or more elements of message processor 158, and/or one or more elements of radio 144. In one example, controller 154, message processor 158, and radio 144 may be implemented as part of the chip or SoC.

In other embodiments, controller 154, message processor 158 and/or radio 144 may be implemented by one or more additional or alternative elements of device 140.

Some demonstrative embodiments may be implemented, for example, in accordance with a new standard in an mmWave band, e.g., a 60 GHz frequency band or any other directional band, for example, as an evolution of an IEEE 802.11*ad standard*.

In some demonstrative embodiments, devices 102 and/or 140 may be configured according to one or more standards, for example, in accordance with an *IEEE* 802.11*ay Standard*, which may be, for example, configured to enhance the efficiency and/or performance of an *IEEE* 802.11*ad Specification*, which may be configured to provide Wi-Fi connectivity in a 60 GHz band.

Some demonstrative embodiments may enable, for example, to significantly increase data transmission rates defined in the *IEEE* 802.11*ad specification*, which may, for example, satisfy growing demand in network capacity for new coming applications.

Some communications over a wireless communication band, for example, a DMG band or any other band, may be performed over a single channel bandwidth (BW). For example, the *IEEE* 802.11*ad Specification* defines a 60 GHz system with a single channel bandwidth (BW) of 2.16 GHz, which is to be used by all Stations (STAs) for both transmission and reception.

In some demonstrative embodiments, device 102 and/or device 140 may be configured to implement one or more mechanisms, which may, for example, enable to extend a single-channel BW scheme, e.g., a scheme in accordance with the *IEEE* 802.11*ad Specification* or any other scheme, for higher data rates and/or increased capabilities, e.g., as described below.

In some demonstrative embodiments, device 102 and/or device 140 may be configured to implement one or more channel bonding mechanisms, which may, for example, support communication over bonded channels.

In some demonstrative embodiments, the channel bonding mechanisms may include, for example, a mechanism and/or an operation whereby two or more channels can be combined, e.g., for a higher bandwidth of packet transmission, for example, to enable achieving higher data rates, e.g., when compared to transmissions over a single channel. Some demonstrative embodiments are described herein with respect to communication over a bonded channel, however other embodiments may be implemented with respect to communications over a channel, e.g., a "wide" channel, including or formed by two or more channels, for example, an aggregated channel including an aggregation of two or more channels.

In some demonstrative embodiments, device 102 and/or device 140 may be configured to implement one or more channel bonding mechanisms, which may, for example, support an increased channel bandwidth, for example, a channel BW of 4.32 GHz, a channel BW of 6.48 GHz, and/or any other additional or alternative channel BW.

In some demonstrative embodiments, devices 102 and/or 140 may be configured to communicate over a Next Generation 60 GHz (NG60) network, an Extended DMG (EDMG) network, and/or any other network. For example, devices 102 and/or 140 may be configured to use channel bonding, for example, for communicating over the NG60 and/or EDMG networks.

Some Specifications, e.g., an *IEEE* 802.11*ad Specification*, may be configured to support a Single User (SU) system, in which a Station (STA) cannot transmit frames to more than a single STA at a time. Such Specifications may not be able, for example, to support a STA transmitting to multiple STAs simultaneously, for example, using a multi-user MIMO (MU-MIMO) scheme, e.g., a downlink (DL) MU-MIMO, or any other MU scheme.

In some demonstrative embodiments, devices 102 and/or 140 may be configured to implement one or more Multi-User (MU) mechanisms. For example, devices 102 and/or 140 may be configured to implement one or more MU mechanisms, which may be configured to enable MU communication of Downlink (DL) frames using a Multiple-Input-Multiple-Output (MIMO) scheme, for example, between a device, e.g., device 102, and a plurality of devices, e.g., including device 140 and/or one or more other devices.

In some demonstrative embodiments, devices 102 and/or 140 may be configured to communicate over a Next Generation 60 GHz (NG60) network, an Extended DMG (EDMG) network, and/or any other network. For example, devices 102 and/or 140 may be configured to communicate MIMO, e.g., DL MU-MIMO, transmissions and/or use channel bonding, for example, for communicating over the NG60 and/or EDMG networks.

In some demonstrative embodiments, devices 102 and/or 140 may be configured to support one or more mechanisms and/or features, for example, channel bonding, single user (SU) MIMO, and/or and multi user (MU) MIMO, for example, in accordance with an *IEEE* 802.11*ay Standard* and/or any other standard and/or protocol.

In some demonstrative embodiments, devices 102 and/or 140 may include, operate as, perform a role of, and/or perform the functionality of, one or more EDMG STAs. For example, device 102 may include, operate as, perform a role of, and/or perform the functionality of, at least one EDMG STA, and/or device 140 may include, operate as, perform a role of, and/or perform the functionality of, at least one EDMG STA.

In one example, an EDMG STA may include a DMG STA whose radio transmitter is capable of transmitting and receiving EDMG physical layer (PHY) protocol data units (PPDUs). The EDMG STA may perform any other additional or alternative functionality.

In some demonstrative embodiments, devices 102 and/or 140 may include EDMG STAs capable of communicating in an EDMG BSS.

In some demonstrative embodiments, device 102 may perform the functionality of an AP STA, and/or device 140 may perform the functionality of a non-AP STA.

In some demonstrative embodiments, MU-MIMO communication performed by an AP STA, which may simultaneously transmit to multiple STAs, for example, during a frame that starts and ends at the same time.

In some demonstrative embodiments, a directionality of communications over a directional frequency band may be an important factor, which may enable for example, to implement unsynchronized MU-MIMO communications, for example, to enable a transmission, e.g., each transmission, from an antenna of an AP STA to a non-AP STA to be performed independently from another transmission from another antenna of the AP STA to another non-AP STA, e.g., as described below.

In some demonstrative embodiments, devices 102 and/or 140 may be configured to perform MU-MIMO communication, in which a station, e.g., device 102, may independently transmit to each STA of a plurality of stations, for example, including device 140, e.g., as described below.

In some demonstrative embodiments, a wireless device, e.g., device 102, may be configured to implement a plurality of independent antennas, for example, while enabling improvements for handovers between the plurality of independent antennas, e.g., as described below.

In some demonstrative embodiments, a wireless device, e.g., device 102, may be configured to implement a plurality of independent antennas, while enabling improvements for interference coordination between the plurality of independent antennas, e.g., as described below.

In some demonstrative embodiments, devices 102 and/or 140 may be configured to perform MU-MIMO communication, in which a first transmission from a first antenna of a first STA, e.g., a STA implemented by device 102, to a second STA, e.g., a STA implemented by device 140, over a first wireless link, may be independent from a second transmission from a second antenna of the first STA, e.g., a second antenna of device 102, to a third STA over a second wireless link, e.g., as described below.

In some demonstrative embodiments, a wireless device, e.g., device 102, may be configured to operate as, perform the role of, and/or perform one or more functionalities of a multi-sectorized antenna AP STA, which may include a plurality of sectorized antennas, e.g., as described below.

In some demonstrative embodiments, a wireless device, e.g., device 102, may be configured to operate as, perform the role of, and/or perform one or more functionalities of a multi-sectorized antenna AP STA, which may be configured to perform unsynchronized MU-MIMO communication via the plurality of sectorized antennas, e.g., as described below.

In some demonstrative embodiments, the multi-sectorized antenna AP STA, e.g., device 102, may be configured to perform one or more signaling operations and/or communications, for example, to support communication via the plurality of sectorized antennas, e.g., as described below.

In some demonstrative embodiments, the plurality of sectorized antennas may be complementary, for example to enable quasi-omni coverage, e.g., as described below.

In some demonstrative embodiments, two or more sectorized antennas may have at least partially overlapping coverage.

In some demonstrative embodiments, two or more sectorized antennas may have non-overlapping coverage.

In some demonstrative embodiments, a multi-sectorized antenna STA, e.g., a multi-sectorized antenna AP STA, may include a plurality of sectorized antennas having different, non-overlapping coverage.

In some demonstrative embodiments, a multi-sectorized antenna STA, e.g., a multi-sectorized antenna AP STA, may include a plurality of sectorized antennas, of which some antenna sectors may have non-overlapping coverage, while other antenna sectors may have overlapping coverage.

In some demonstrative embodiments, the plurality of sectorized antennas may be configured to have different coverage, for example, to enable at least to reduce interference between the sectorized antennas, e.g., as described below.

In some demonstrative embodiments, a sectorized antenna of the plurality of sectorized antennas, e.g., each sectorized antenna, may be associated with a baseband (BB) processing, and a Media Access Control (MAC) Enhanced Distributed Channel Access Function (EDCAF), e.g., as described below.

In some demonstrative embodiments, a sectorized antenna of the plurality of sectorized antennas, e.g., each sectorized antenna, may be fully independent from other sectorized antennas of the plurality of sectorized antennas, e.g., as described below.

In one example, the sectorized antenna may be configured to transmit or receive, for example, even without requiring any time synchronization with other sectorized antennas of the plurality of sectorized antennas. For example, a first sectorized antenna of the plurality of sectorized antennas may be able to transmit a transmission, while a second sectorized antenna of the plurality of sectorized antennas may receive a transmission.

In some demonstrative embodiments, two or more sectorized antennas of the plurality of antennas may be operated at a synchronized manner. For example, the two sectorized antennas may be operated to transmit simultaneously, an/or the two sectorized antennas may be operated to receive simultaneously.

In some demonstrative embodiments, a multi-sectorized antenna STA, e.g., a multi-sectorized antenna AP STA, for example, device 102, may include a common or shared MAC module, which may be configured to commonly control the plurality of sectorized antennas, e.g., as described below.

In some demonstrative embodiments, the common MAC may be configured to perform coordination between the plurality of sectorized antennas, to perform interference mitigation between the plurality of sectorized antennas, and/or to handle association with one or more STAs, and/or to perform one or more additional or alternative upper-MAC operations and/or functionalities, e.g., as described below.

In some demonstrative embodiments, a multi-sectorized antenna STA, e.g., a multi-sectorized antenna AP STA, for example, device 102, may implement an architecture, which may be configured to support and/or enable operation of the plurality of sectorized antennas, e.g., as described below.

Figure 2:
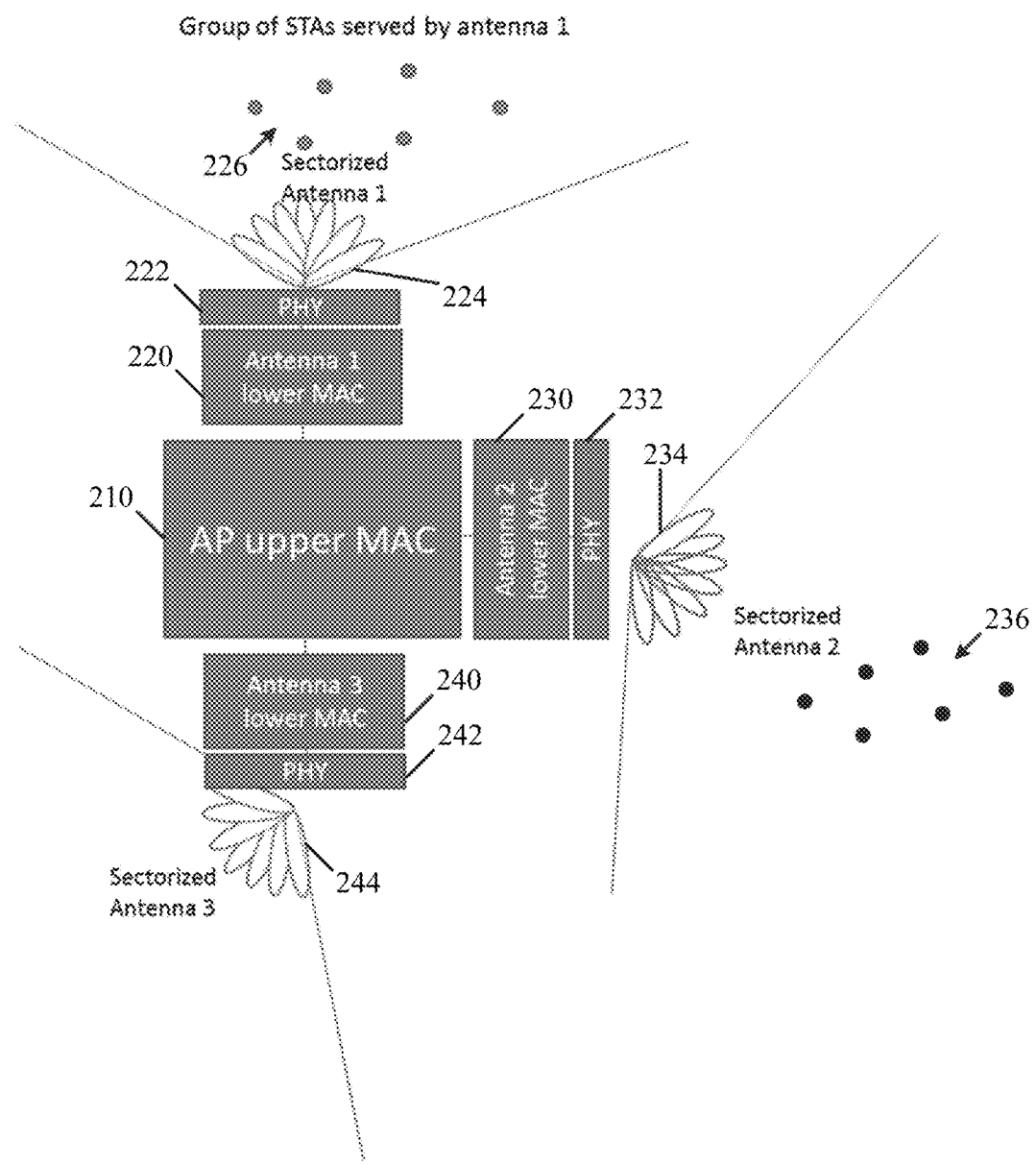
FIG. 2 is a schematic illustration of an architecture of a wireless station having a plurality of sectorized antennas, in accordance with some demonstrative embodiments.

Reference is made to FIG. 2, which schematically illustrates an architecture of a wireless station 200 having a plurality of sectorized antennas, in accordance with some demonstrative embodiments.

In some demonstrative embodiments, a wireless STA, for example, an AP STA, e.g., device 102 (FIG. 1), may implement wireless station 200, for example, to support and/or enable one or more operations of a plurality of sectorized antennas, e.g., as described below.

In some demonstrative embodiments, as shown in FIG. 2, wireless station 200 may include an upper MAC component 210.

In some demonstrative embodiments, upper MAC component 210 may include, and/or may be implemented, for example, by an upper MAC controller. In one example, controller 124 (FIG. 1) and/or message processor 128 (FIG. 1) may include, perform the role of, perform one or more operations of, and/or perform one or more functionalities of upper MAC component 210.

In some demonstrative embodiments, upper MAC component 210 may be unique for an AP STA, e.g., the AP STA may include one upper MAC component. In other embodiments, one or more functionalities of upper AMC component 210 may be distributed between two or more upper MAC components of the wireless station 200.

In some demonstrative embodiments, upper MAC component 210 may be configured to present a single MAC Service Access Point (SAP) to upper layers of the wireless station 200.

In some demonstrative embodiments, as shown in FIG. 2, wireless station 200 may include a plurality of lower MAC components, e.g., lower MAC components 220, 230 and 240.

In some demonstrative embodiments, as shown in FIG. 2, wireless station 200 may include a plurality of Physical layer (PHY) components, e.g., PHY components 222, 232 and 242.

In some demonstrative embodiments, as shown in FIG. 2, wireless station 200 may include a plurality of sectorized antennas, e.g., sectorized antennas 224, 234 and 244.

In some demonstrative embodiments, as shown in FIG. 2, the plurality of sectorized antennas may be associated with respective ones of the plurality of lower MAC components, and/or with respective ones of the PHY components.

In one example, as shown in FIG. 2, sectorized antenna 224 may be associated with PHY component 222 and lower MAC component 220; sectorized antenna 234 may be associated with PHY component 232 and lower MAC component 230; and/or sectorized antenna 244 may be associated with PHY component 242 and lower MAC component 240.

In some demonstrative embodiments, the plurality of lower MAC components may include, and/or may be implemented, for example, by a respective plurality of lower MAC controllers. In one example, controller 124 (FIG. 1) and/or message processor 128 (FIG. 1) may include, perform the role of, perform one or more operations of, and/or perform one or more functionalities of the plurality of lower MAC components.

In some demonstrative embodiments, the plurality of PHY components may include, and/or may be implemented, for example, by a respective plurality of PHY controllers. In one example, controller 124 (FIG. 1) and/or message processor 128 (FIG. 1) may include, perform the role of, perform one or more operations of, and/or perform one or more functionalities of the plurality of PHY components.

In some demonstrative embodiments, the plurality of sectorized antennas may include, and/or may be implemented by, for example, antennas 107 (FIG. 1).

In some demonstrative embodiments, the plurality of PHY components may include circuitry and/or logic configured to communicate via the respective plurality of sectorized antennas over a directional frequency band. For example, PHY component 222 may be configured to communicate via sectorized antenna 224, PHY component 232 may be configured to communicate via sectorized antenna 234, and/or PHY component 242 may be configured to communicate via sectorized antenna 244.

In some demonstrative embodiments, a lower MAC component of the plurality of lower MAC components may be configured to control channel access of the wireless station 200 via a respective sectorized antenna of the plurality of sectorized antennas.

In one example, a lower MAC component of the plurality of lower MAC components may be configured to manage and/or control, for example, at least a clear channel assessment (CCA), and/or an EDCAF over a channel via the sectorized antenna associated with the lower MAC component.

In some demonstrative embodiments, a lower MAC component of the plurality of lower MAC components may be configured to process MAC Protocol Data Units (PDUs) to be communicated via the sectorized antenna associated with the lower MAC component.

In some demonstrative embodiments, a lower MAC component of the plurality of lower MAC components may be configured to generate the MAC PDUs to be transmitted via the sectorized antenna associated with the lower MAC component.

In some demonstrative embodiments, the lower MAC component of the plurality of lower MAC components may be configured to process received MAC PDUs, and/or to manage retransmissions of the received MAC PDUs, e.g., via the sectorized antenna associated with the lower MAC component.

For example, lower MAC component 220 may be configured to control channel access of wireless station 200 via sectorized antenna 224 and/or to generate and/or process MAC PDUs to be communicated via sectorized antenna 224; lower MAC component 230 may be configured to control channel access of wireless station 200 via sectorized antenna 234 and/or to generate and/or process MAC PDUs to be communicated via sectorized antenna 234; and/or lower MAC component 240 may be configured to control channel access of wireless station 200 via sectorized antenna 244 and/or to generate and/or process MAC PDUs to be communicated via sectorized antenna 244.

In some demonstrative embodiments, as shown in FIG. 2, upper MAC component 210 may be connected to, coupled to, associated with and/or configured to manage and/or control one or more operations of the plurality of lower MAC components 220, 230 and/or 240.

In some demonstrative embodiments, upper MAC component 210 may be configured to coordinate unsynchronized communication via the plurality of sectorized antennas 224, 234, and/or 244, e.g., as described below.

In some demonstrative embodiments, upper MAC component 210 may be configured to coordinate the unsynchronized communication, for example, by coordinating, triggering, controlling and/or managing, transmission via at least one first sectorized antenna, for example, simultaneously with reception via at least one second sectorized antenna. For example, upper MAC component 210 may be configured to coordinate transmission via sectorized antenna 224 simultaneously with reception via sectorized antenna 244.

In some demonstrative embodiments, upper MAC component 210 may be configured to coordinate the unsynchronized communication, for example, by coordinating, triggering, controlling and/or managing a MU communication including transmission to at least one first user STA via the at least one first sectorized antenna, and reception from at least one second user STA via the at least one second sectorized antenna. For example, upper MAC component 210 may be configured to coordinate transmission via sectorized antenna 224 to one or more users 226, and reception from one or more users 236 via sectorized antenna 234, e.g., during one or more non overlapping, partially overlapping, and/or fully overlapping time periods.

In some demonstrative embodiments, upper MAC component 210 may be configured to coordinate the unsynchronized communication, for example, by coordinating, triggering, controlling and/or managing a MU-MIMO communication including, for example, beamformed transmission to the at least one first user STA via at least one first sectorized antenna, and beamformed reception from at least one second user STA via at least one second sectorized antenna. For example, upper MAC component 210 may be configured to coordinate beamformed transmission via sectorized antenna 224 to one or more users 226, and beamformed reception from one or more users 236 via sectorized antenna 234, e.g., during one or more non overlapping, partially overlapping, and/or fully overlapping time periods.

In some demonstrative embodiments, upper MAC component 210 may be configured to manage association between wireless STA 200, e.g., an AP STA, and one or more other wireless stations, e.g., one or more user STAs 226 and/or 236.

In some demonstrative embodiments, upper MAC component 210 may be configured to manage security of communication via the plurality of sectorized antennas, e.g., with user STAs 226 and/or 236.

In some demonstrative embodiments, upper MAC component 210 may be configured to manage interference coordination and/or mitigation between the plurality of sectorized antennas of wireless station 200, e.g., as described below.

Figure 3:
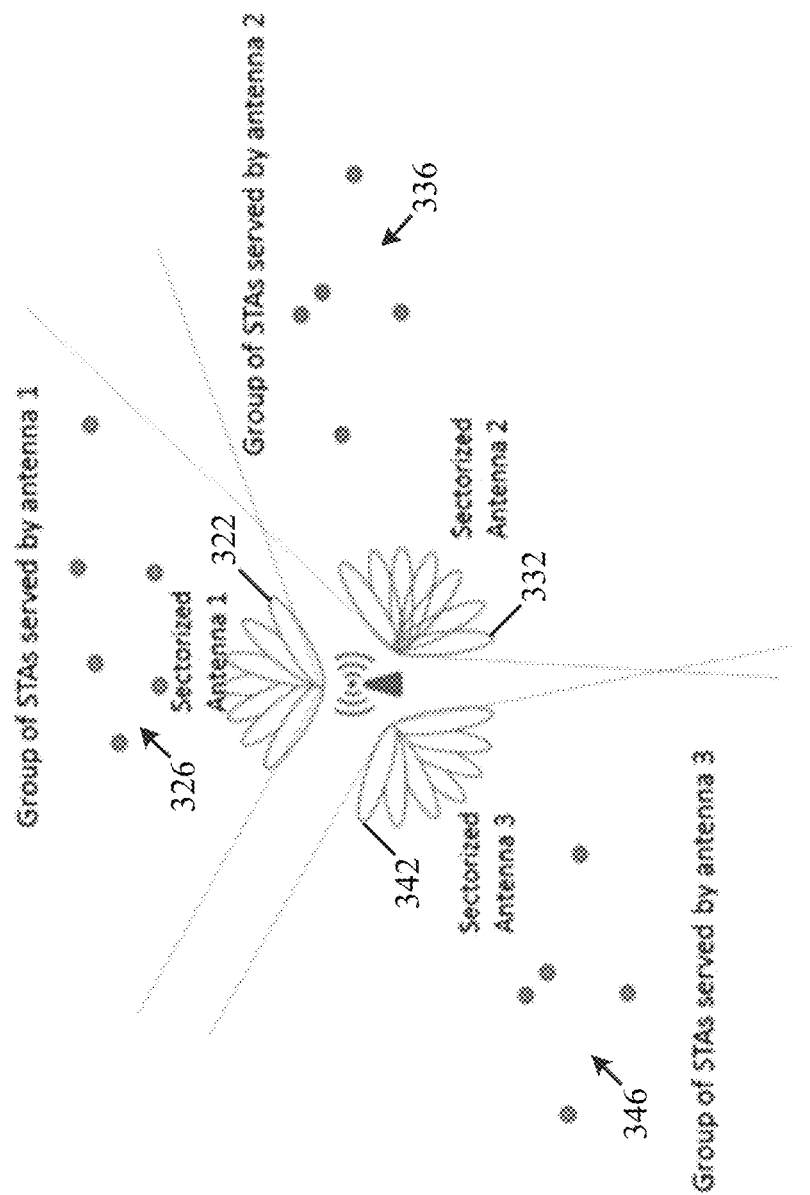
FIG. 3 is a schematic illustration of a coverage scheme of a plurality of sectorized antennas of an Access Point (AP), in accordance with some demonstrative embodiments.

Reference is made to FIG. 3, which schematically illustrates a coverage scheme 300 of a plurality of sectorized antennas of an AP 302, in accordance with some demonstrative embodiments. For example, AP 302 may include, operate as, and/or perform one or more functionalities of, wireless station 200 (FIG. 2). For example, device 102 (FIG. 1) may be configured to operate as, perform a role of, and/or perform one or more functionalities of, AP 302.

In some demonstrative embodiments, as shown in FIG. 3, the plurality of sectorized antennas of AP 302 may include a first sectorized antenna 322 to communicate with one or more users 326, a second sectorized antenna 332 to communicate with one or more users 336, and/or a third sectorized antenna 342 to communicate with one or more users 346.

In some demonstrative embodiments, as shown in FIG. 3, there may be an overlap between the coverage of sectorized antennas 322 and 332, and/or between sectorized antennas 332 and 342, for example, to enable handoff between sectorized antennas 322, 332, and/or 342.

Referring back to FIG. 1, in some demonstrative embodiments, an AP STA, e.g., device 102, may be configured to transition and/or handover between the plurality of sectorized antennas, e.g., between sectorized antennas 224, 234 and/or 244 (FIG. 2), for example, to transition and/or handover one or more stations, e.g., device 140, between a first sectorized antenna, e.g., sectorized antenna 224 (FIG. 2), and a second sectorized antenna, e.g., sectorized antenna 234 (FIG. 2), e.g., as described below.

In some demonstrative embodiments, the transition or handover of a station, e.g., device 140, between first and second sectorized antennas of the AP STA, e.g., device 102, may be initiated by the AP STA, e.g., by device 102, as described below.

In some demonstrative embodiments, the transition or handover of a station, e.g., device 140, between first and second sectorized antennas of the AP STA, e.g., device 102, may be initiated by the station, e.g., by device 140, as described below.

In some demonstrative embodiments, an AP STA, e.g., device 102, may be configured to initiate a transition or handover of a wireless station, e.g., device 140, between first and second sectorized antennas of the AP STA, for example, between first and second sectorized antennas 107 of device 102, e.g., as described below.

In some demonstrative embodiments, controller 124 may be configured to trigger, cause, instruct and/or control device 102 to handover a wireless station implemented by device 140 between a first sectorized antenna 107, e.g., sectorized antenna 224 (FIG. 2), and a second sectorized antenna 107, e.g., sectorized antenna 234 (FIG. 2).

In some demonstrative embodiments, controller 124 may include, trigger, cause, implement, control, and/or instruct one or more elements of wireless station 200 (FIG. 2), for example, to transition between the first and second sectorized antennas 107.

In some demonstrative embodiments, a STA, e.g., device 140, may associate with an AP STA, e.g., device 102, and may receive from the AP STA an indication that the AP STA, e.g., device 102, operates with a plurality of sectorized antennas and that the mode of operation is unsynchronized MU-MIMO, for example, such that at least one sectorized antenna of the AP STA may be allowed to operate independently from other sectorized antennas of the AP STA.

In some demonstrative embodiments, the AP STA, e.g., device 102, may be configured to determine, define, and/or set for a STA, e.g., device 140, which one or more sectorized antennas of the plurality of sectorized antennas of the AP STA, e.g., which of sectorized antennas 224, 234, and/o 244 (FIG. 2), are to be used for communication between the STA and the AP STA.

In some demonstrative embodiments, the AP STA, e.g., device 102, and the STA, e.g., device 140, may be configured to negotiate, which one or more sectorized antennas of the plurality of sectorized antennas of the AP STA, e.g., which of sectorized antennas 224, 234, and/o 244 (FIG. 2), are to be used for communication between the STA and the AP STA.

In one example, device 140 may communicate with a single sectorized antenna of the plurality of sectorized antennas of device 102.

In another example, device 140 may communicate with two or more sectorized antennas of the plurality of sectorized antennas of device 102.

In some demonstrative embodiments, device 102 may communicate with device 140 via a first sectorized antenna of device 102, e.g., sectorized antenna 224 (FIG. 2).

In some demonstrative embodiments, device 102 may be configured to initiate a transition of device 140 between the first sectorized antenna of device 102 and a second sectorized antenna of device 102, for example, sectorized antenna 234 (FIG. 2), e.g., as described below.

In some demonstrative embodiments, the transition of device 140 between the sectorized antennas of device 102 may be performed in a manner, which may enable, for example, performing the transition, for example, even without requiring devices 102 and/or 140 to perform a reassociation procedure, e.g., as described below.

In some demonstrative embodiments, allowing devices 102 and/or 140 to perform the transition between the sectorized antennas of device 102, e.g., even without requiring devices 102 and/or 140 to perform a reassociation procedure, may be advantageous, for example, compared to an implementation of unsynchronized MU-MIMO with a plurality of APs, which are pointing in different complementary directions, and are being coordinated by a controller, for example, at least since such an implementation may require reassociation when transitioning between the different APs.

In some demonstrative embodiments, device 102 may be configured to initiate the transition device 140 between the sectorized antennas of device 102 in an implicit manner, for example, according to a first mode of operation, e.g., as described below.

In some demonstrative embodiments, device 102 may be configured to initiate the transition device 140 between the sectorized antennas of device 102 in an explicit manner, for example, according to a second mode of operation, e.g., as described below.

In some demonstrative embodiments, devices 102 and/or 140 may be configured to initiate a transition, and/or to perform a transition initiated according to, the first mode of operation and/or according to the second mode of operation, and/or according to any additional or alternative mode of operation.

In some demonstrative embodiments, device 102 may be configured to implicitly initiate the transition of device 140 between the first sectorized antenna of device 102, e.g., sectorized antenna 224 (FIG. 2), and the second sectorized antenna of device 102, e.g., sectorized antenna 234 (FIG. 2), for example, by transmitting a frame to device 140 via the second sectorized antenna, e.g., as described below.

In some demonstrative embodiments, the frame may include a beamforming training frame, e.g., in the form of a beacon frame, a Sector Sweep (SSW) frame, a Beam Refinement Protocol (BRP) frame, and/or any other frame configured to initiate a beamforming training.

In some demonstrative embodiments, the beamforming training frame may include a sectorized antenna identifier (ID) to indicate that the beamforming training frame.

In some demonstrative embodiments, device 140 may be configured to determine that device 140 is to transition from communicating with the first sectorized antenna of device 102 to communicating with the second sectorized antenna of device 102, for example, upon device 140 receiving the beamforming training frame, which is transmitted from the second sectorized antenna of device 102.

For example, device 140 may be configured to determine that device 140 is to transition from communicating with the first sectorized antenna of device 102 to communicating with the second sectorized antenna of device 102, for example, upon device 140 receiving the beamforming training frame including the sectorized antenna ID of the second sectorized antenna of device 102.

In some demonstrative embodiments, devices 102 and/or 140 may be configured to perform beamforming training of the second sectorized antenna of device 102 with device 140, for example, subsequent to the communication of the beamforming training frame from the second sectorized antenna of device 102 to device 140.

In some demonstrative embodiments, device 102 may be configured to select to continue using the first sectorized antenna of device 102 to communicate with device 140, e.g., after performing the beamforming training of the second sectorized antenna of device 102 with device 140. For example, device 102, may be allowed to decide to perform the beamforming training of the second sectorized antenna of device 102 with device 140, for example, while selecting not to perform a transition of device 140 to the second sectorized antenna of device 102, e.g., for any reason.

In some demonstrative embodiments, device 102 may be configured to signal to device 140 an indication on whether or not the device 102 is to transition to use the second sectorized antenna, which was used for the beamforming training, for further communication with device 140.

In some demonstrative embodiments, device 102 may be configured to transmit to device 140 a frame, e.g., at the beamforming training of the second sectorized antenna of device 102 with device 140, including a bit set to a first value, e.g., to indicate that the device 102 is to transition to use the second sectorized antenna, for further communication with device 140, or a second value, e.g., to indicate that the device 102 is not transition to use the second sectorized antenna.

In some demonstrative embodiments, device 102 may include in an SSW-acknowledge (Ack) frame to be transmitted at an end of a Sector Level Sweep (SLS) phase a bit, e.g., in a BRP request field format or in any other filed, which may be set by device 102 to indicate whether or not the second sectorized antenna of device 102, over which the SLS phase was performed, is to be used for communication with device 140.

In some demonstrative embodiments, device 102 may include in a BRP frame to be transmitted at an end of a BRP training phase, a bit, e.g., in a BRP request field format or in any other filed, which may be set by device 102 to indicate whether or not the second sectorized antenna of device 102, over which the SLS phase was performed, is to be used for communication with device 140.

In some demonstrative embodiments, controller 124 may be configured to trigger, cause, instruct and/or control device 102 to communicate one or more first frames with device 140 via a first sectorized antenna of the plurality of sectorized antennas of device 102, e.g., sectorized antenna 224 (FIG. 2), for example, during a first beamforming training with device 140.

In some demonstrative embodiments, the first frames may include a first Identifier (ID) of the first sectorized antenna, e.g., an ID of sectorized antenna 224 (FIG. 2).

In some demonstrative embodiments, controller 154 may be configured to trigger, cause, instruct and/or control device 140 to communicate the one or more first frames with the first sectorized antenna of device 102, for example, during the first beamforming training with device 102.

In some demonstrative embodiments, controller 124 may be configured to trigger, cause, instruct and/or control device 102 to communicate one or more beamformed transmissions with device 140, for example, based on the first beamforming training with device 140.

For example, 124 may be configured to trigger, cause, instruct and/or control device 102 to communicate one or more beamformed transmissions with device 140, via the first sectorized antenna of device 102, e.g., via sectorized antenna 224 (FIG. 2).

In some demonstrative embodiments, controller 154 may be configured to trigger, cause, instruct and/or control device 140 to communicate the one or more beamformed transmissions with device 102, for example, based on the first beamforming training with device 102.

In some demonstrative embodiments, controller 124 may be configured to trigger, cause, instruct and/or control device 102 to communicate a second frame with device 140 via a second sectorized antenna of the plurality of sectorized antennas of device 102, e.g., via sectorized antenna 234 (FIG. 2).

In some demonstrative embodiments, the second frame may be configured to initiate a second beamforming training between the second sectorized antenna of device 102 and device 140.

In some demonstrative embodiments, controller 124 may be configured to trigger, cause, instruct and/or control device 102 and/or transmitter 118 to transmit the second frame to device 140, for example, to initiate, e.g., to implicitly initiate, the second beamforming training between the second sectorized antenna of device 102 and device 140.

In some demonstrative embodiments, the second frame may include a second ID of the second sectorized antenna, e.g., an ID of sectorized antenna 234 (FIG. 2).

In some demonstrative embodiments, the second frame may include the beamforming training frame.

In some demonstrative embodiments, the second frame may include a beacon frame, a SSW frame, a BRP frame, or any other frame.

In some demonstrative embodiments, controller 124 may be configured to trigger, cause, instruct and/or control device 102 to transition to communicate one or more subsequent beamformed transmissions with device 140, for example, via the second sectorized antenna, e.g., sectorized antenna 234 (FIG. 2), for example, based on the second beamforming training.

In some demonstrative embodiments, device 140 may receive the second frame, which is transmitted via the second sectorized antenna of device 102, and may be aware that device 102 is to transitions to communicate with device 140 via the second sectorized antenna of device 102.

In some demonstrative embodiments, controller 154 may be configured to trigger, cause, instruct and/or control device 140 to receive and/or process the second frame including the second ID of the second sectorized antenna of device 102.

In some demonstrative embodiments, controller 154 may be configured to trigger, cause, instruct and/or control device 140 to perform the second beamforming training between device 140 and the second sectorized antenna of device 102, for example, based on the second frame.

In some demonstrative embodiments, controller 154 may be configured to trigger, cause, instruct and/or control device 140 to transition to communicate the one or more subsequent beamformed transmissions with the second sectorized antenna of device 102, for example, based on the second beamforming training.

In some demonstrative embodiments, device 102 may be configured to indicate whether or not device 102 is to transit to the second sectorized antenna, for example, after performing the second beamforming training.

In one example, device 102 may perform the second beamforming training via the second sectorized antenna, for example, even without transitioning to the second sectorized antenna, e.g., to allow device 102 test and/or to analyze one or more settings of the second sectorized antenna for communication with device 140.

In some demonstrative embodiments, controller 124 may be configured to trigger, cause, instruct and/or control device 102 to transmit a beamforming training frame of the second beamforming training, for example, to indicate whether or not device 102 is to transition to the second sectorized antenna, for example, after performing the second beamforming training.

In some demonstrative embodiments, the beamforming training frame of the second beamforming training may include a transition indicator, e.g., a bit or any other indication, field and/or value, to indicate whether or not device 102 is to transition from the first sectorized antenna to the second sectorized antenna.

In some demonstrative embodiments, controller 124 may be configured to trigger, cause, instruct and/or control device 102 to transmit the beamforming training frame of the second beamforming training including the transition indicator including a no-transition indication, for example, to indicate that beamformed communication, e.g., between device 102 and device 140, is to be maintained via the first sectorized antenna, e.g., subsequent to the second beamforming training.

In some demonstrative embodiments, controller 124 may be configured to trigger, cause, instruct and/or control device 102 to transmit the beamforming training frame of the second beamforming training including the transition indicator including a transition indication to indicate a transition from the first sectorized antenna to the second sectorized antenna, e.g., for beamformed communication between device 102 and device 140.

In some demonstrative embodiments, device 102 may be configured to include the transition indicator as part of an SSW Ack frame, for example, if the beamforming training frame of the second beamforming training is to be transmitted at the end of an SLS phase.

In some demonstrative embodiments, controller 124 may be configured to trigger, cause, instruct and/or control device 102 to communicate an SSW ACK frame including the transition indicator.

In some demonstrative embodiments, device 102 may be configured to include the transition indicator as part of a BRP frame, for example, if the beamforming training frame of the second beamforming training is to be transmitted at an end of a BRP phase.

In some demonstrative embodiments, controller 124 may be configured to trigger, cause, instruct and/or control device 102 to communicate a BRP frame including the transition indicator.

In some demonstrative embodiments, device 140 may receive from device 102 the beamforming training frame of the second beamforming training indicating whether or not device 102 is to transition to the second sectorized antenna of device 102, e.g., after performing the second beamforming training.

In some demonstrative embodiments, controller 154 may be configured to trigger, cause, instruct and/or control device 140 to process the beamforming training frame of the second beamforming training including the transition indicator to indicate whether or not device 102 is to transition from the first sectorized antenna to the second sectorized antenna.

In some demonstrative embodiments, controller 154 may be configured to trigger, cause, instruct and/or control device 140 to process the SSW Ack frame including the transition indicator e.g., at the end of the SLS phase.

In some demonstrative embodiments, controller 154 may be configured to trigger, cause, instruct and/or control device 140 to process the BRP frame including the transition indicator, e.g., at the end of the BRP.

In some demonstrative embodiments, controller 154 may be configured to trigger, cause, instruct and/or control device 140 to select, for example, based on the transition indicator, between communicating one or more subsequent beamformed transmissions with device 102 based on the first beamforming training, and communicating the one or more subsequent beamformed transmissions with device 102 based on the second beamforming training.

In some demonstrative embodiments, controller 154 may be configured to trigger, cause, instruct and/or control device 140 to communicate the one or more subsequent beamformed transmissions with device 102 based on the first beamforming training, e.g., when the transition indicator includes the no-transition indication to indicate that beamformed communication is to be maintained via the first sectorized antenna of device 102 subsequent to the second beamforming training.

In some demonstrative embodiments, controller 154 may be configured to trigger, cause, instruct and/or control device 140 to communicate the one or more subsequent beamformed transmissions with device 102 based on the second beamforming training, for example, when the transition indicator includes the transition indication to indicate a transition from the first sectorized antenna to the second sectorized antenna of device 102.

In some demonstrative embodiments, device 102 may be configured to explicitly initiate the transition of device from the first sectorized antenna of device 102, e.g., sectorized antenna 224 (FIG. 2), to the second sectorized antenna of device 102, e.g., sectorized antenna 234 (FIG. 2), for example, by explicitly requesting device 140 to transition from the first sectorized antenna of device 102 to the second sectorized antenna of device 102.

In some demonstrative embodiments, device 102 may be configured to send a frame ("the transition initiation frame") to device 140, which may be configured, for example, to request, e.g., to explicitly request, device 140 to move between the first and second sectorized antennas of device 102, and to perform beamforming training with the second sectorized antenna of device 102, e.g., as described below.

In some demonstrative embodiments, the transition initiation frame may include a time at which the transition between the first and second sectorized antennas of device 102 is to occur, e.g., as described below.

In some demonstrative embodiments, the transition initiation frame may be configured, for example, in a form of a grant frame-like including a rendezvous time point with the second sectorized antenna.

In some demonstrative embodiments, device 102 may be configured to access a channel, e.g., at the rendezvous time, for example, to initiate a beamforming training phase with device 140, e.g., via the second sectorized antenna of device 102, e.g., as described below.

In some demonstrative embodiments, the transition initiation frame may be configured to include, for example, a neighbor report element or a reduced neighbor report element, which may be configured to signal a request to device 140 to move between the first and second sectorized antennas of device 102.

In some demonstrative embodiments, the neighbor report element may configured to include an indication that information in the neighbor report element is to correspond to a sectorized antenna of an APS STA transmitting the neighbor report element, e.g., the second sectorized antenna of device 102, for example, and not to another station, e.g., another AP STA.

In some demonstrative embodiments, device 140 may be configured to receive and process the transition initiation frame including the neighbor report element, and to determine, e.g., based on the neighbor report element, that the device 140 is to perform beamforming training with the second sectorized antenna of device 102.

In some demonstrative embodiments, device 140 may be configured to initiate beamforming training with the second sectorized antenna of device 102, for example, even if the transition initiation frame does not indicate a rendezvous point, and/or even if device 140 misses reception of one or more beamforming training frames from device 102.

In some demonstrative embodiments, an AP STA, e.g., device 102, may be configured to maintain and/or update one or more look-up tables of STAs served by each sectorized antenna of the plurality of sectorized antennas of device 102; and/or device 102 may be able to identify and/or respond to an initiation frame from device 140, for example, to initiate the beamforming training with the second sectorized antenna of device 102.

In some demonstrative embodiments, controller 124 may be configured to trigger, cause, instruct and/or control device 102 and/or transmitter 118 to transmit a frame including a timing to initiate the second beamforming training.

In some demonstrative embodiments, the frame may include a neighbor report element including a neighbor field, and a timing field.

In some demonstrative embodiments, the neighbor field may include the ID of the second sectorized antenna of device 102, e.g., the sector ID of sectorized antenna 234 (FIG. 2).

In some demonstrative embodiments, the timing field may include an indication of the timing to initiate the second beamforming training.

In some demonstrative embodiments, device 140 may receive the frame including the timing to initiate the second beamforming training.

In some demonstrative embodiments, controller 154 may be configured to trigger, cause, instruct and/or control device 140 and/or receiver 146 to process the frame including the timing to initiate the second beamforming training.

In some demonstrative embodiments, controller 154 may be configured to trigger, cause, instruct and/or control device 140 to perform the beamforming training with the second sectorized antenna, for example, based on the neighbor report element, for example, by processing the neighbor report element including the neighbor field including the second ID of the second sectorized antenna of device 102, and the timing field including the timing to initiate the second beamforming training.

In some demonstrative embodiments, a wireless station may be configured to initiate the transition of the wireless station between the first and second sectorized antennas of an AP STA, e.g., as described below.

In some demonstrative embodiments, device 140 may be configured to initiate the transition of device 140 between the first and second sectorized antennas of device 102, e.g., as described below.

In some demonstrative embodiments, device 140 may be configured to request device 102 to switch to the second sectorized antenna, for example, to test a connection quality over the second sectorized antenna, e.g., compared to a connection quality over the first sectorized antenna, and/or to perform one or more additional operations, and/or for one or more reasons.

In some demonstrative embodiments, device 140 may transmit a beamforming training frame to request device 102 to switch to the second sectorized antenna, for example, if device 140 is to initiate a beamforming training sequence with the second sectorized antenna of device 102.

In some demonstrative embodiments, controller 154 may be configured to trigger, cause, instruct and/or control device 140 to transmit the beamforming training frame to device 102, for example, to indicate whether or not device 140 is to transition to communicate with device 140 via the second sectorized antenna, for example, after performing the second beamforming training between devices 102 and 140.

In some demonstrative embodiments, the beamforming training frame from device 140 may include a field including the sectorized antenna ID of the second sectorized antenna of device 102, e.g., the sectorized antenna ID of sectorized antenna 234 (FIG. 2).

In some demonstrative embodiments, the indication of the sectorized antenna ID of the second sectorized antenna of device 102, may enable device 102 to identify which sectorized antenna of device 102 is to be used by device 102 for the second beamforming training with device 140.

For example, the indication of the sectorized antenna ID of the second sectorized antenna of device 102, may enable device 102 to avoid a situation, in which device 102 may erroneously perform the beamforming training with device 140 via a plurality of sectorized antennas of device 102, e.g., if the beamforming training frame from device 140 is received by the plurality of sectorized antennas of device 102.

In some demonstrative embodiments, the beamforming training frame from device 140 may include a BRP frame, and one or more bits of the BRP frame, e.g., one or more reserved bits of the BRP frame, or one or more bits of a dedicated field of the BRP frame, may be used to indicate the sectorized antenna ID of the second sectorized antenna of device 102.

In some demonstrative embodiments, the beamforming training frame from device 140 may include a BRP frame, and a control trailer at the end of the BRP frame may be used to indicate the sectorized antenna ID of the second sectorized antenna of device 102.

In some demonstrative embodiments, the beamforming training frame from device 140 may include an SSW frame, and a control trailer at the end of the SSW frame may be used to indicate the sectorized antenna ID of the second sectorized antenna of device 102.

In some demonstrative embodiments, an enhanced_SSW frame may be defined, for example, to include one or more bits to indicate the sectorized antenna ID of the second sectorized antenna of device 102.

In some demonstrative embodiments, device 140 may be configured to indicate to device 102 whether or not the second sectorized antenna, of device 102, via which the beamforming training is performed, is to be used for subsequent communication with device 140, e.g., as a serving AP sectorized antenna for device 140.

In one example, the beamforming training frame from device 140 may include the transition indicator including a no-transition indication, for example, to indicate that beamformed communication is to be maintained via the first sectorized antenna of device 102.

In another example, the beamforming training frame from device 140 may include the transition indicator including a transition indication to indicate a transition from the first sectorized antenna to the second sectorized antenna of device 102.

In some demonstrative embodiments, device 102 may receive the beamforming training frame from device 140 indicating whether or not device 140 is to transition to the second sectorized antenna of device 102, e.g., after performing the second beamforming training between device s102 and 140.

In some demonstrative embodiments, controller 124 may be configured to trigger, cause, instruct and/or control device 102 to process the beamforming training frame from device 140 including the transition indicator to indicate whether or not device 140 is to transition from the first sectorized antenna to the second sectorized antenna of device 102.

In some demonstrative embodiments, controller 124 may be configured to trigger, cause, instruct and/or control device 102 to communicate one or more subsequent beamformed transmissions with device 140, e.g., based on the first beamforming training via the first sectorized antenna of device 102, e.g., when the transition indicator in the beamforming training frame from device 140 includes the no-transition indication to indicate that device 140 is to remain on the first sectorized antenna.

In some demonstrative embodiments, controller 124 may be configured to trigger, cause, instruct and/or control device 102 to communicate one or more subsequent beamformed transmissions with device 140, e.g., based on the second beamforming training via the second sectorized antenna of device 102, for example, when the transition indicator in the beamforming training frame from device 140 includes a transition indication to indicate that device 140 requests to transition from the first sectorized antenna to the second sectorized antenna of device 102.

Figure 4:
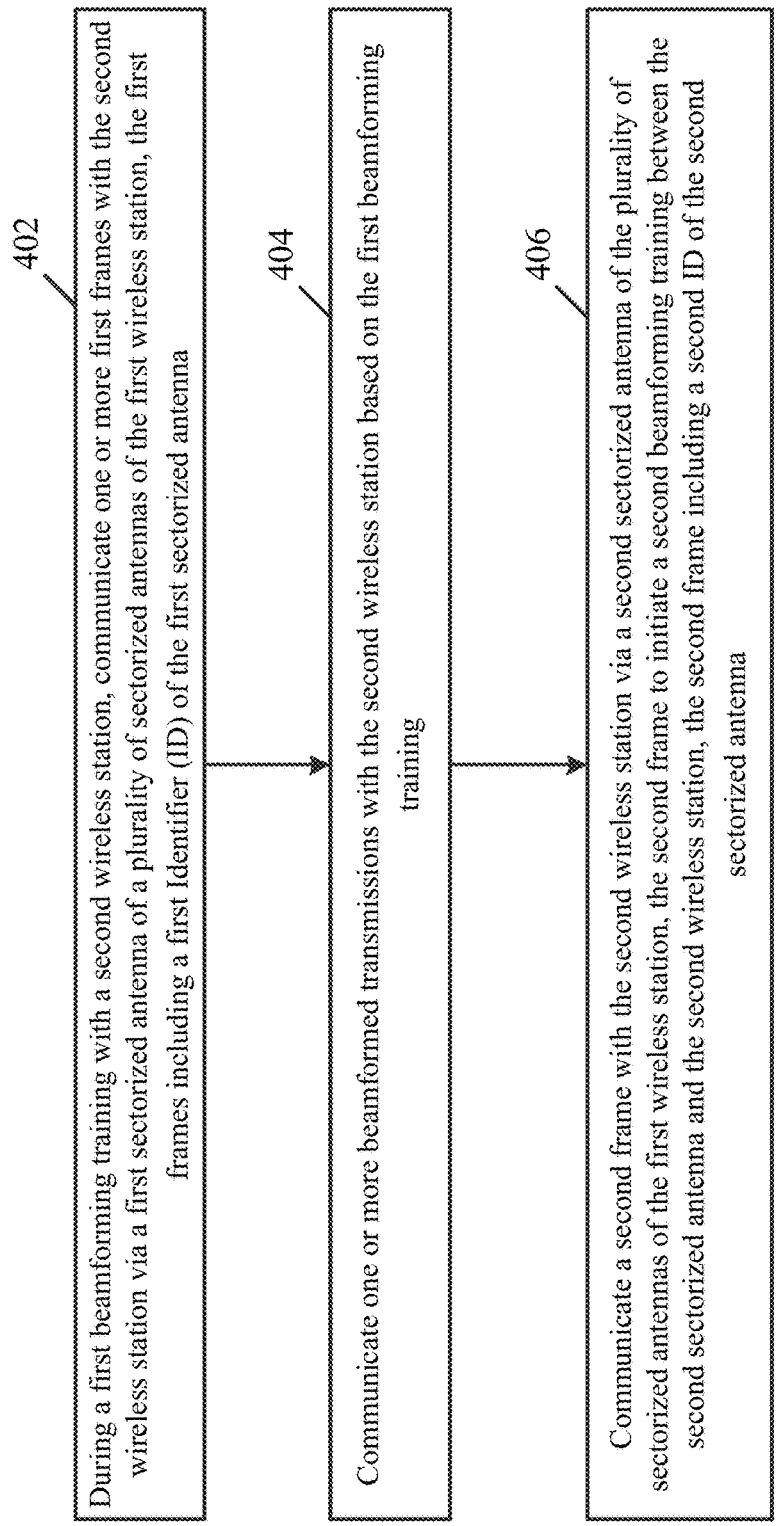
FIG. 4 is a schematic flow-chart illustration of a method of communicating via a plurality of sectorized antennas, in accordance with some demonstrative embodiments.

Reference is made to FIG. 4, which schematically illustrates a method of communicating via a plurality of sectorized antennas, in accordance with some demonstrative embodiments. For example, one or more of the operations of the method of FIG. 4 may be performed by one or more elements of a system, e.g., system 100 (FIG. 1), for example, one or more wireless devices, e.g., device 102 (FIG. 1), and/or device 140 (FIG. 1); a controller, e.g., controller 154 (FIG. 1), and/or controller 124 (FIG. 1); a radio, e.g., radio 114 (FIG. 1), and/or radio 144 (FIG. 1); a transmitter, e.g., transmitter 118 (FIG. 1), and/or transmitter 148 (FIG. 1); a receiver e.g., receiver 116 (FIG. 1), and/or receiver 146 (FIG. 1); and/or a message processor, e.g., message processor 128 (FIG. 1), and/or message processor 158 (FIG. 1); a wireless station, e.g., wireless station 200 (FIG. 2) and/.or wireless station 226 (FIG. 2); an upper MAC component, e.g., upper MAC component 210 (FIG. 2); a lower MAC component, e.g., lower MAC components 220, 230 and/or 240 (FIG. 2); and/or a lower PHY component, e.g., lower PHY components 222, 232 and/or 242 (FIG. 2).

As indicated at block 402, the method may include at a first wireless station, during a first beamforming training with the second wireless station, communicating one or more first frames with a second wireless station via a first sectorized antenna of a plurality of sectorized antennas of the first wireless station, the first frames including a first ID of the first sectorized antenna. For example, device 102 (FIG. 1) may transmit one or more first frames to device 140 (FIG. 1) via a first sectorized antenna of antennas 107 (FIG. 1), the first frames including a first ID of the first sectorized antenna, for example, during a first beamforming training with device 140 (FIG. 1), e.g., as described above.

As indicated at block 404, the method may include communicating one or more beamformed transmissions with the second wireless station, for example, based on the first beamforming training. For example, device 102 (FIG. 1) may communicate one or more beamformed transmissions with device 140 (FIG. 1), for example, based on the first beamforming training via the first sectorized antenna of device 102 (FIG. 1), e.g., as described above.

As indicated at block 406, the method may include communicating a second frame with the second wireless station via a second sectorized antenna of the plurality of sectorized antennas of the first wireless station, the second frame to initiate a second beamforming training between the second sectorized antenna and the second wireless station, the second frame including a second ID of the second sectorized antenna. For example, device 102 (FIG. 1) may communicate with device 140 (FIG. 1) a second frame including a second ID of a second sectorized antenna to device 102 (FIG. 1) to initiate a second beamforming training between a second sectorized antenna of device 102 (FIG. 1) and device 140 (FIG. 1), e.g., as described above.

Figure 5:
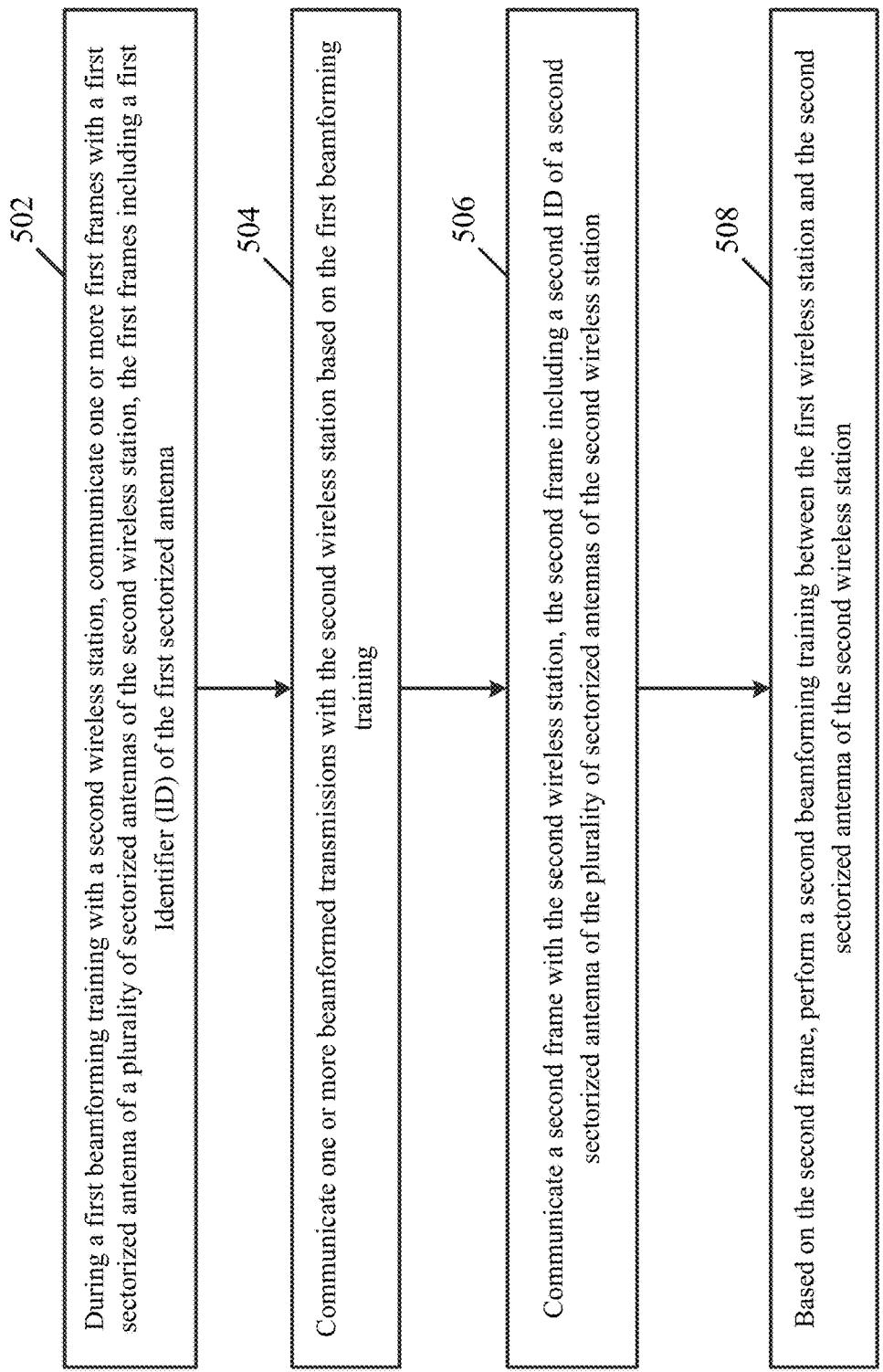
FIG. 5 is a schematic flow-chart illustration of a method of communicating with a wireless station having a plurality of sectorized antennas, in accordance with some demonstrative embodiments.

Reference is made to FIG. 5, which schematically illustrates a method of communicating via a plurality of sectorized antennas, in accordance with some demonstrative embodiments. For example, one or more of the operations of the method of FIG. 5 may be performed by one or more elements of a system, e.g., system 100 (FIG. 1), for example, one or more wireless devices, e.g., device 102 (FIG. 1), and/or device 140 (FIG. 1); a controller, e.g., controller 154 (FIG. 1), and/or controller 124 (FIG. 1); a radio, e.g., radio 114 (FIG. 1), and/or radio 144 (FIG. 1); a transmitter, e.g., transmitter 118 (FIG. 1), and/or transmitter 148 (FIG. 1); a receiver e.g., receiver 116 (FIG. 1), and/or receiver 146 (FIG. 1); and/or a message processor, e.g., message processor 128 (FIG. 1), and/or message processor 158 (FIG. 1); a wireless station, e.g., wireless station 200 (FIG. 2) and/.or wireless station 226 (FIG. 2); an upper MAC component, e.g., upper MAC component 210 (FIG. 2); a lower MAC component, e.g., lower MAC components 220, 230 and/or 240 (FIG. 2); and/or a lower PHY component, e.g., lower PHY components 222, 232 and/or 242 (FIG. 2).

As indicated at block 502, the method may include communicating at a first wireless station, during a first beamforming training with a second wireless station, one or more first frames with the second wireless station via a first sectorized antenna of a plurality of sectorized antennas of the second wireless station, the first frames including a first ID of the first sectorized antenna of the second wireless station. For example, device 140 (FIG. 1) may communicate one or more first frames with device 102 (FIG. 1) via a first sectorized antenna of the plurality of sectorized antennas of device 102 (FIG. 1), the first frames including the first ID of the first sectorized antenna of device 102 (FIG. 1), for example, during a first beamforming training with device 102 (FIG. 1), e.g., as described above.

As indicated at block 504, the method may include communicating one or more beamformed transmissions with the second wireless station, for example, based on the first beamforming training. For example, device 140 (FIG. 1) may communicate one or more beamformed transmissions with device 102 (FIG. 1), for example, based on the first beamforming training, e.g., as described above.

As indicated at block 506, the method may include communicating a second frame with the second wireless station, the second frame including a second ID of a second sectorized antenna of the plurality of sectorized antennas of the second wireless station. For example, device 140 (FIG. 1) may communicate with device 102 (FIG. 1) a second frame including the second ID of the second sectorized antenna of device 102 (FIG. 1), e.g., as described above.

As indicated at block 508, the method may include performing a second beamforming training between the first wireless station and the second sectorized antenna of the second wireless station based on the second frame. For example, device 140 (FIG. 1) may perform a second beamforming training between device 140 (FIG. 1) and the second sectorized antenna of device 102 (FIG. 1), for example based on the second frame communicated with device 102 (FIG. 1), e.g., as described above.

Figure 6:
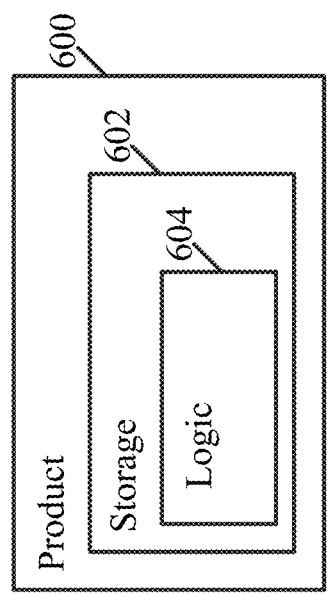
FIG. 6 is a schematic illustration of a product of manufacture, in accordance with some demonstrative embodiments.

Reference is made to FIG. 6, which schematically illustrates a product of manufacture 600, in accordance with some demonstrative embodiments. Product 600 may include one or more tangible computer-readable non-transitory storage media 602, which may include computer-executable instructions, e.g., implemented by logic 604, operable to, when executed by at least one computer processor, enable the at least one computer processor to implement one or more operations at device 102 (FIG. 1), device 140 (FIG. 1), radio 114 (FIG. 1), radio 144 (FIG. 1), transmitter 118 (FIG. 1), transmitter 148 (FIG. 1), receiver 116 (FIG. 1), receiver 146 (FIG. 1), controller 124 (FIG. 1), controller 154 (FIG. 1), message processor 128 (FIG. 1), and/or message processor 158 (FIG. 1), wireless station 200 (FIG. 200), wireless station 226 (FIG. 2), upper MAC component 210 (FIG. 2), lower MAC components 220, 230 and/or 240 (FIG. 2), lower PHY components 222, 232 and/or 242 (FIG. 2), and/or to perform, trigger and/or implement one or more operations, communications and/or functionalities as described above with reference to FIGS. 1, 2, 3, 4, and/or 5, and/or one or more operations described herein. The phrase "non-transitory machine-readable medium" is directed to include all computer-readable media, with the sole exception being a transitory propagating signal.

In some demonstrative embodiments, product 600 and/or machine-readable storage medium 602 may include one or more types of computer-readable storage media capable of storing data, including volatile memory, non-volatile memory, removable or non-removable memory, erasable or non-erasable memory, writeable or re-writeable memory, and the like. For example, machine-readable storage medium 602 may include, RAM, DRAM, Double-Data-Rate DRAM (DDR-DRAM), SDRAM, static RAM (SRAM), ROM, programmable ROM (PROM), erasable programmable ROM (EPROM), electrically erasable programmable ROM (EEPROM), Compact Disk ROM (CD-ROM), Compact Disk Recordable (CD-R), Compact Disk Rewriteable (CD-RW), flash memory (e.g., NOR or NAND flash memory), content addressable memory (CAM), polymer memory, phase-change memory, ferroelectric memory, silicon-oxide-nitride-oxide-silicon (SONOS) memory, a disk, a floppy disk, a hard drive, an optical disk, a magnetic disk, a card, a magnetic card, an optical card, a tape, a cassette, and the like. The computer-readable storage media may include any suitable media involved with downloading or transferring a computer program from a remote computer to a requesting computer carried by data signals embodied in a carrier wave or other propagation medium through a communication link, e.g., a modem, radio or network connection.

In some demonstrative embodiments, logic 604 may include instructions, data, and/or code, which, if executed by a machine, may cause the machine to perform a method, process and/or operations as described herein. The machine may include, for example, any suitable processing platform, computing platform, computing device, processing device, computing system, processing system, computer, processor, or the like, and may be implemented using any suitable combination of hardware, software, firmware, and the like.

In some demonstrative embodiments, logic 604 may include, or may be implemented as, software, firmware, a software module, an application, a program, a subroutine, instructions, an instruction set, computing code, words, values, symbols, and the like. The instructions may include any suitable type of code, such as source code, compiled code, interpreted code, executable code, static code, dynamic code, and the like. The instructions may be implemented according to a predefined computer language, manner or syntax, for instructing a processor to perform a certain function. The instructions may be implemented using any suitable high-level, low-level, object-oriented, visual, compiled and/or interpreted programming language, such as C, C++, C#, Java, Python, BASIC, Matlab, Pascal, Visual BASIC, assembly language, machine code, and the like.

EXAMPLES

The following examples pertain to further embodiments.

Example 1 includes an apparatus comprising circuitry and logic configured to cause a first wireless station to during a first beamforming training with a second wireless station, communicate one or more first frames with the second wireless station via a first sectorized antenna of a plurality of sectorized antennas of the first wireless station, the first frames comprising a first Identifier (ID) of the first sectorized antenna; communicate one or more beamformed transmissions with the second wireless station based on the first beamforming training; and communicate a second frame with the second wireless station via a second sectorized antenna of the plurality of sectorized antennas of the first wireless station, the second frame to initiate a second beamforming training between the second sectorized antenna and the second wireless station, the second frame comprising a second ID of the second sectorized antenna.

Example 2 includes the subject matter of Example 1, and optionally, wherein the apparatus is configured to cause the first wireless station to communicate one or more subsequent beamformed transmissions with the second wireless station via the second sectorized antenna based on the second beamforming training.

Example 3 includes the subject matter of Example 1 or 2, and optionally, wherein the apparatus is configured to cause the first wireless station to communicate a beamforming training frame of the second beamforming training comprising a transition indicator to indicate whether or not the first wireless station is to transition from the first sectorized antenna to the second sectorized antenna.

Example 4 includes the subject matter of Example 3, and optionally, wherein the apparatus is configured to cause the first wireless station to communicate the beamforming training frame comprising the transition indicator comprising a no-transition indication to indicate that beamformed communication is to be maintained via the first sectorized antenna subsequent to the second beamforming training.

Example 5 includes the subject matter of Example 3, and optionally, wherein the apparatus is configured to cause the first wireless station to communicate the beamforming training frame comprising the transition indicator comprising a transition indication to indicate a transition from the first sectorized antenna to the second sectorized antenna.

Example 6 includes the subject matter of any one of Examples 3-5, and optionally, wherein the apparatus is configured to cause the first wireless station to communicate a Sector Sweep (SSW) Acknowledgement (Ack) frame comprising the transition indicator.

Example 7 includes the subject matter of any one of Examples 3-5, and optionally, wherein the apparatus is configured to cause the first wireless station to communicate a Beamforming Refinement Phase (BRP) frame comprising the transition indicator.

Example 8 includes the subject matter of any one of Examples 1-7, and optionally, wherein the apparatus is configured to cause the first wireless station to transmit the second frame to the second wireless station to initiate the second beamforming training between the second sectorized antenna of the first wireless station and the second wireless station.

Example 9 includes the subject matter of any one of Examples 1-7, and optionally, wherein the apparatus is configured to cause the first wireless station to process the second frame received from the second wireless station.

Example 10 includes the subject matter of any one of Examples 1-9, and optionally, wherein the second frame comprises a timing to initiate the second beamforming training.

Example 11 includes the subject matter of Example 10, and optionally, wherein the second frame comprises a neighbor report element comprising a neighbor field, and a timing field, the neighbor field comprising the second ID of the second sectorized antenna, and the timing field comprising an indication of the timing to initiate the second beamforming training.

Example 12 includes the subject matter of any one of Examples 1-11, and optionally, wherein the second frame comprises a beamforming training frame.

Example 13 includes the subject matter of any one of Examples 1-12, and optionally, wherein the second frame comprises a beacon frame, a Sector Sweep (SSW) frame, or a Beamforming Refinement Phase (BRP) frame.

Example 14 includes the subject matter of any one of Examples 1-13, and optionally, wherein the first wireless station comprises an Access Point (AP).

Example 15 includes the subject matter of any one of Examples 1-14, and optionally, comprising the plurality of sectorized antennas.

Example 16 includes the subject matter of any one of Examples 1-15, and optionally, comprising a radio, a memory and a processor.

Example 17 includes a system of wireless communication comprising a first wireless station, the first wireless station comprising a plurality of sectorized antennas; a radio; a memory; a processor; and a controller configured to cause the first wireless station to during a first beamforming training with a second wireless station, communicate one or more first frames with the second wireless station via a first sectorized antenna of the plurality of sectorized antennas of the first wireless station, the first frames comprising a first Identifier (ID) of the first sectorized antenna; communicate one or more beamformed transmissions with the second wireless station based on the first beamforming training; and communicate a second frame with the second wireless station via a second sectorized antenna of the plurality of sectorized antennas of the first wireless station, the second frame to initiate a second beamforming training between the second sectorized antenna and the second wireless station, the second frame comprising a second ID of the second sectorized antenna.

Example 18 includes the subject matter of Example 17, and optionally, wherein the controller is configured to cause the first wireless station to communicate one or more subsequent beamformed transmissions with the second wireless station via the second sectorized antenna based on the second beamforming training.

Example 19 includes the subject matter of Example 17 or 18, and optionally, wherein the controller is configured to cause the first wireless station to communicate a beamforming training frame of the second beamforming training comprising a transition indicator to indicate whether or not the first wireless station is to transition from the first sectorized antenna to the second sectorized antenna.

Example 20 includes the subject matter of Example 19, and optionally, wherein the controller is configured to cause the first wireless station to communicate the beamforming training frame comprising the transition indicator comprising a no-transition indication to indicate that beamformed communication is to be maintained via the first sectorized antenna subsequent to the second beamforming training.

Example 21 includes the subject matter of Example 19, and optionally, wherein the controller is configured to cause the first wireless station to communicate the beamforming training frame comprising the transition indicator comprising a transition indication to indicate a transition from the first sectorized antenna to the second sectorized antenna.

Example 22 includes the subject matter of any one of Examples 19-21, and optionally, wherein the controller is configured to cause the first wireless station to communicate a Sector Sweep (SSW) Acknowledgement (Ack) frame comprising the transition indicator.

Example 23 includes the subject matter of any one of Examples 19-21, and optionally, wherein the controller is configured to cause the first wireless station to communicate a Beamforming Refinement Phase (BRP) frame comprising the transition indicator.

Example 24 includes the subject matter of any one of Examples 17-23, and optionally, wherein the controller is configured to cause the first wireless station to transmit the second frame to the second wireless station to initiate the second beamforming training between the second sectorized antenna of the first wireless station and the second wireless station.

Example 25 includes the subject matter of any one of Examples 17-23, and optionally, wherein the controller is configured to cause the first wireless station to process the second frame received from the second wireless station.

Example 26 includes the subject matter of any one of Examples 17-25, and optionally, wherein the second frame comprises a timing to initiate the second beamforming training.

Example 27 includes the subject matter of Example 26, and optionally, wherein the second frame comprises a neighbor report element comprising a neighbor field, and a timing field, the neighbor field comprising the second ID of the second sectorized antenna, and the timing field comprising an indication of the timing to initiate the second beamforming training.

Example 28 includes the subject matter of any one of Examples 17-27, and optionally, wherein the second frame comprises a beamforming training frame.

Example 29 includes the subject matter of any one of Examples 17-28, and optionally, wherein the second frame comprises a beacon frame, a Sector Sweep (SSW) frame, or a Beamforming Refinement Phase (BRP) frame.

Example 30 includes the subject matter of any one of Examples 17-29, and optionally, wherein the first wireless station comprises an Access Point (AP).

Example 31 includes a method to be performed at a first wireless station, the method comprising during a first beamforming training with a second wireless station, communicating one or more first frames with the second wireless station via a first sectorized antenna of a plurality of sectorized antennas of the first wireless station, the first frames comprising a first Identifier (ID) of the first sectorized antenna; communicating one or more beamformed transmissions with the second wireless station based on the first beamforming training; and communicating a second frame with the second wireless station via a second sectorized antenna of the plurality of sectorized antennas of the first wireless station, the second frame to initiate a second beamforming training between the second sectorized antenna and the second wireless station, the second frame comprising a second ID of the second sectorized antenna.

Example 32 includes the subject matter of Example 31, and optionally, comprising communicating one or more subsequent beamformed transmissions with the second wireless station via the second sectorized antenna based on the second beamforming training.

Example 33 includes the subject matter of Example 31 or 32, and optionally, comprising communicating a beamforming training frame of the second beamforming training comprising a transition indicator to indicate whether or not the first wireless station is to transition from the first sectorized antenna to the second sectorized antenna.

Example 34 includes the subject matter of Example 33, and optionally, comprising communicating the beamforming training frame comprising the transition indicator comprising a no-transition indication to indicate that beamformed communication is to be maintained via the first sectorized antenna subsequent to the second beamforming training.

Example 35 includes the subject matter of Example 33, and optionally, comprising communicating the beamforming training frame comprising the transition indicator comprising a transition indication to indicate a transition from the first sectorized antenna to the second sectorized antenna.

Example 36 includes the subject matter of any one of Examples 33-35, and optionally, comprising communicating a Sector Sweep (SSW) Acknowledgement (Ack) frame comprising the transition indicator.

Example 37 includes the subject matter of any one of Examples 33-35, and optionally, comprising communicating a Beamforming Refinement Phase (BRP) frame comprising the transition indicator.

Example 38 includes the subject matter of any one of Examples 31-37, and optionally, comprising transmitting the second frame to the second wireless station to initiate the second beamforming training between the second sectorized antenna of the first wireless station and the second wireless station.

Example 39 includes the subject matter of any one of Examples 31-37, and optionally, comprising processing the second frame received from the second wireless station.

Example 40 includes the subject matter of any one of Examples 31-39, and optionally, wherein the second frame comprises a timing to initiate the second beamforming training.

Example 41 includes the subject matter of Example 40, and optionally, wherein the second frame comprises a neighbor report element comprising a neighbor field, and a timing field, the neighbor field comprising the second ID of the second sectorized antenna, and the timing field comprising an indication of the timing to initiate the second beamforming training.

Example 42 includes the subject matter of any one of Examples 31-41, and optionally, wherein the second frame comprises a beamforming training frame.

Example 43 includes the subject matter of any one of Examples 31-42, and optionally, wherein the second frame comprises a beacon frame, a Sector Sweep (SSW) frame, or a Beamforming Refinement Phase (BRP) frame.

Example 44 includes the subject matter of any one of Examples 31-43, and optionally, wherein the first wireless station comprises an Access Point (AP).

Example 45 includes a product including one or more tangible computer-readable non-transitory storage media comprising computer-executable instructions operable to, when executed by at least one computer processor, enable the at least one computer processor to implement operations at a first wireless station, the operations comprising during a first beamforming training with a second wireless station, communicating one or more first frames with the second wireless station via a first sectorized antenna of a plurality of sectorized antennas of the first wireless station, the first frames comprising a first Identifier (ID) of the first sectorized antenna; communicating one or more beamformed transmissions with the second wireless station based on the first beamforming training; and communicating a second frame with the second wireless station via a second sectorized antenna of the plurality of sectorized antennas of the first wireless station, the second frame to initiate a second beamforming training between the second sectorized antenna and the second wireless station, the second frame comprising a second ID of the second sectorized antenna.

Example 46 includes the subject matter of Example 45, and optionally, wherein the operations comprise communicating one or more subsequent beamformed transmissions with the second wireless station via the second sectorized antenna based on the second beamforming training.

Example 47 includes the subject matter of Example 45 or 46, and optionally, wherein the operations comprise communicating a beamforming training frame of the second beamforming training comprising a transition indicator to indicate whether or not the first wireless station is to transition from the first sectorized antenna to the second sectorized antenna.

Example 48 includes the subject matter of Example 47, and optionally, wherein the operations comprise communicating the beamforming training frame comprising the transition indicator comprising a no-transition indication to indicate that beamformed communication is to be maintained via the first sectorized antenna subsequent to the second beamforming training.

Example 49 includes the subject matter of Example 47, and optionally, wherein the operations comprise communicating the beamforming training frame comprising the transition indicator comprising a transition indication to indicate a transition from the first sectorized antenna to the second sectorized antenna.

Example 50 includes the subject matter of any one of Examples 47-49, and optionally, wherein the operations comprise communicating a Sector Sweep (SSW) Acknowledgement (Ack) frame comprising the transition indicator.

Example 51 includes the subject matter of any one of Examples 47-49, and optionally, wherein the operations comprise communicating a Beamforming Refinement Phase (BRP) frame comprising the transition indicator.

Example 52 includes the subject matter of any one of Examples 45-51, and optionally, wherein the operations comprise transmitting the second frame to the second wireless station to initiate the second beamforming training between the second sectorized antenna of the first wireless station and the second wireless station.

Example 53 includes the subject matter of any one of Examples 45-51, and optionally, wherein the operations comprise processing the second frame received from the second wireless station.

Example 54 includes the subject matter of any one of Examples 45-53, and optionally, wherein the second frame comprises a timing to initiate the second beamforming training.

Example 55 includes the subject matter of Example 54, and optionally, wherein the second frame comprises a neighbor report element comprising a neighbor field, and a timing field, the neighbor field comprising the second ID of the second sectorized antenna, and the timing field comprising an indication of the timing to initiate the second beamforming training.

Example 56 includes the subject matter of any one of Examples 45-55, and optionally, wherein the second frame comprises a beamforming training frame.

Example 57 includes the subject matter of any one of Examples 45-56, and optionally, wherein the second frame comprises a beacon frame, a Sector Sweep (SSW) frame, or a Beamforming Refinement Phase (BRP) frame.

Example 58 includes the subject matter of any one of Examples 45-57, and optionally, wherein the first wireless station comprises an Access Point (AP).

Example 59 includes an apparatus of wireless communication by a first wireless station, the apparatus comprising means for, during a first beamforming training with a second wireless station, communicating one or more first frames with the second wireless station via a first sectorized antenna of a plurality of sectorized antennas of the first wireless station, the first frames comprising a first Identifier (ID) of the first sectorized antenna; means for communicating one or more beamformed transmissions with the second wireless station based on the first beamforming training; and means for communicating a second frame with the second wireless station via a second sectorized antenna of the plurality of sectorized antennas of the first wireless station, the second frame to initiate a second beamforming training between the second sectorized antenna and the second wireless station, the second frame comprising a second ID of the second sectorized antenna.

Example 60 includes the subject matter of Example 59, and optionally, comprising means for communicating one or more subsequent beamformed transmissions with the second wireless station via the second sectorized antenna based on the second beamforming training.

Example 61 includes the subject matter of Example 59 or 60, and optionally, comprising means for communicating a beamforming training frame of the second beamforming training comprising a transition indicator to indicate whether or not the first wireless station is to transition from the first sectorized antenna to the second sectorized antenna.

Example 62 includes the subject matter of Example 61, and optionally, comprising means for communicating the beamforming training frame comprising the transition indicator comprising a no-transition indication to indicate that beamformed communication is to be maintained via the first sectorized antenna subsequent to the second beamforming training.

Example 63 includes the subject matter of Example 61, and optionally, comprising means for communicating the beamforming training frame comprising the transition indicator comprising a transition indication to indicate a transition from the first sectorized antenna to the second sectorized antenna.

Example 64 includes the subject matter of any one of Examples 61-63, and optionally, comprising means for communicating a Sector Sweep (SSW) Acknowledgement (Ack) frame comprising the transition indicator.

Example 65 includes the subject matter of any one of Examples 61-63, and optionally, comprising means for communicating a Beamforming Refinement Phase (BRP) frame comprising the transition indicator.

Example 66 includes the subject matter of any one of Examples 59-65, and optionally, comprising means for transmitting the second frame to the second wireless station to initiate the second beamforming training between the second sectorized antenna of the first wireless station and the second wireless station.

Example 67 includes the subject matter of any one of Examples 59-65, and optionally, comprising means for processing the second frame received from the second wireless station.

Example 68 includes the subject matter of any one of Examples 59-67, and optionally, wherein the second frame comprises a timing to initiate the second beamforming training.

Example 69 includes the subject matter of Example 68, and optionally, wherein the second frame comprises a neighbor report element comprising a neighbor field, and a timing field, the neighbor field comprising the second ID of the second sectorized antenna, and the timing field comprising an indication of the timing to initiate the second beamforming training.

Example 70 includes the subject matter of any one of Examples 59-69, and optionally, wherein the second frame comprises a beamforming training frame.

Example 71 includes the subject matter of any one of Examples 59-70, and optionally, wherein the second frame comprises a beacon frame, a Sector Sweep (SSW) frame, or a Beamforming Refinement Phase (BRP) frame.

Example 72 includes the subject matter of any one of Examples 59-71, and optionally, wherein the first wireless station comprises an Access Point (AP).

Example 73 includes an apparatus comprising circuitry and logic configured to cause a first wireless station to during a first beamforming training with a second wireless station, communicate one or more first frames with a first sectorized antenna of a plurality of sectorized antennas of the second wireless station, the first frames comprising a first Identifier (ID) of the first sectorized antenna; communicate one or more beamformed transmissions with the second wireless station based on the first beamforming training; communicate a second frame with the second wireless station, the second frame comprising a second ID of a second sectorized antenna of the plurality of sectorized antennas of the second wireless station; and based on the second frame, perform a second beamforming training between the first wireless station and the second sectorized antenna of the second wireless station.

Example 74 includes the subject matter of Example 73, and optionally, wherein the apparatus is configured to cause the first wireless station to communicate one or more subsequent beamformed transmissions with the second sectorized antenna of the second wireless station based on the second beamforming training.

Example 75 includes the subject matter of Example 73 or 74, and optionally, wherein the apparatus is configured to cause the first wireless station to process a beamforming training frame of the second beamforming training comprising a transition indicator to indicate whether or not the second wireless station is to transition from the first sectorized antenna to the second sectorized antenna, and, based on the transition indicator, to select between communicating one or more subsequent beamformed transmissions with the second wireless station based on the first beamforming training and communicating the one or more subsequent beamformed transmissions with the second wireless station based on the second beamforming training.

Example 76 includes the subject matter of Example 75, and optionally, wherein the apparatus is configured to cause the first wireless station to communicate the one or more subsequent beamformed transmissions with the second wireless station based on the first beamforming training, when the transition indicator comprises a no-transition indication to indicate that beamformed communication is to be maintained via the first sectorized antenna subsequent to the second beamforming training.

Example 77 includes the subject matter of Example 75, and optionally, wherein the apparatus is configured to cause the first wireless station to communicate the one or more subsequent beamformed transmissions with the second wireless station based on the second beamforming training, when the transition indicator comprises a transition indication to indicate a transition from the first sectorized antenna to the second sectorized antenna.

Example 78 includes the subject matter of any one of Examples 75-77, and optionally, wherein the apparatus is configured to cause the first wireless station to process a Sector Sweep (SSW) Acknowledgement (Ack) frame comprising the transition indicator.

Example 79 includes the subject matter of any one of Examples 75-77, and optionally, wherein the apparatus is configured to cause the first wireless station to process a Beamforming Refinement Phase (BRP) frame comprising the transition indicator.

Example 80 includes the subject matter of any one of Examples 73-79, and optionally, wherein the apparatus is configured to cause the first wireless station to transmit the second frame to the second wireless station to initiate the second beamforming training with the second sectorized antenna of the second wireless station.

Example 81 includes the subject matter of any one of Examples 73-79, and optionally, wherein the apparatus is configured to cause the first wireless station to process the second frame received from the second wireless station.

Example 82 includes the subject matter of any one of Examples 73-81, and optionally, wherein the second frame comprises a timing to initiate the second beamforming training.

Example 83 includes the subject matter of Example 82, and optionally, wherein the second frame comprises a neighbor report element comprising a neighbor field, and a timing field, the neighbor field comprising the second ID of the second sectorized antenna, and the timing field comprising an indication of the timing to initiate the second beamforming training.

Example 84 includes the subject matter of any one of Examples 73-83, and optionally, wherein the second frame comprises a beamforming training frame.

Example 85 includes the subject matter of any one of Examples 73-84, and optionally, wherein the second frame comprises a beacon frame, a Sector Sweep (SSW) frame, or a Beamforming Refinement Phase (BRP) frame.

Example 86 includes the subject matter of any one of Examples 73-85, and optionally, wherein the second wireless station comprises an Access Point (AP).

Example 87 includes the subject matter of any one of Examples 73-86, and optionally, comprising one or more antennas, a radio, a memory and a processor.

Example 88 includes a system of wireless communication comprising a first wireless station, the first wireless station comprising one or more antennas; a radio; a memory; a processor; a controller configured to cause the first wireless station to during a first beamforming training with a second wireless station, communicate one or more first frames with a first sectorized antenna of a plurality of sectorized antennas of the second wireless station, the first frames comprising a first Identifier (ID) of the first sectorized antenna; communicate one or more beamformed transmissions with the second wireless station based on the first beamforming training; communicate a second frame with the second wireless station, the second frame comprising a second ID of a second sectorized antenna of the plurality of sectorized antennas of the second wireless station; and based on the second frame, perform a second beamforming training between the first wireless station and the second sectorized antenna of the second wireless station.

Example 89 includes the subject matter of Example 88, and optionally, wherein the controller is configured to cause the first wireless station to communicate one or more subsequent beamformed transmissions with the second sectorized antenna of the second wireless station based on the second beamforming training.

Example 90 includes the subject matter of Example 88 or 89, and optionally, wherein the controller is configured to cause the first wireless station to process a beamforming training frame of the second beamforming training comprising a transition indicator to indicate whether or not the second wireless station is to transition from the first sectorized antenna to the second sectorized antenna, and, based on the transition indicator, to select between communicating one or more subsequent beamformed transmissions with the second wireless station based on the first beamforming training and communicating the one or more subsequent beamformed transmissions with the second wireless station based on the second beamforming training.

Example 91 includes the subject matter of Example 90, and optionally, wherein the controller is configured to cause the first wireless station to communicate the one or more subsequent beamformed transmissions with the second wireless station based on the first beamforming training, when the transition indicator comprises a no-transition indication to indicate that beamformed communication is to be maintained via the first sectorized antenna subsequent to the second beamforming training.

Example 92 includes the subject matter of Example 90, and optionally, wherein the controller is configured to cause the first wireless station to communicate the one or more subsequent beamformed transmissions with the second wireless station based on the second beamforming training, when the transition indicator comprises a transition indication to indicate a transition from the first sectorized antenna to the second sectorized antenna.

Example 93 includes the subject matter of any one of Examples 90-92, and optionally, wherein the controller is configured to cause the first wireless station to process a Sector Sweep (SSW) Acknowledgement (Ack) frame comprising the transition indicator.

Example 94 includes the subject matter of any one of Examples 90-92, and optionally, wherein the controller is configured to cause the first wireless station to process a Beamforming Refinement Phase (BRP) frame comprising the transition indicator.

Example 95 includes the subject matter of any one of Examples 88-94, and optionally, wherein the controller is configured to cause the first wireless station to transmit the second frame to the second wireless station to initiate the second beamforming training with the second sectorized antenna of the second wireless station.

Example 96 includes the subject matter of any one of Examples 88-94, and optionally, wherein the controller is configured to cause the first wireless station to process the second frame received from the second wireless station.

Example 97 includes the subject matter of any one of Examples 88-96, and optionally, wherein the second frame comprises a timing to initiate the second beamforming training.

Example 98 includes the subject matter of Example 97, and optionally, wherein the second frame comprises a neighbor report element comprising a neighbor field, and a timing field, the neighbor field comprising the second ID of the second sectorized antenna, and the timing field comprising an indication of the timing to initiate the second beamforming training.

Example 99 includes the subject matter of any one of Examples 88-98, and optionally, wherein the second frame comprises a beamforming training frame.

Example 100 includes the subject matter of any one of Examples 88-99, and optionally, wherein the second frame comprises a beacon frame, a Sector Sweep (SSW) frame, or a Beamforming Refinement Phase (BRP) frame.

Example 101 includes the subject matter of any one of Examples 88-100, and optionally, wherein the second wireless station comprises an Access Point (AP).

Example 102 includes a method to be performed at a first wireless station, the method comprising during a first beamforming training with a second wireless station, communicating one or more first frames with a first sectorized antenna of a plurality of sectorized antennas of the second wireless station, the first frames comprising a first Identifier (ID) of the first sectorized antenna; communicating one or more beamformed transmissions with the second wireless station based on the first beamforming training; communicating a second frame with the second wireless station, the second frame comprising a second ID of a second sectorized antenna of the plurality of sectorized antennas of the second wireless station; and based on the second frame, performing a second beamforming training between the first wireless station and the second sectorized antenna of the second wireless station.

Example 103 includes the subject matter of Example 102, and optionally, comprising communicating one or more subsequent beamformed transmissions with the second sectorized antenna of the second wireless station based on the second beamforming training.

Example 104 includes the subject matter of Example 102 or 103, and optionally, comprising processing a beamforming training frame of the second beamforming training comprising a transition indicator to indicate whether or not the second wireless station is to transition from the first sectorized antenna to the second sectorized antenna, and, based on the transition indicator, selecting between communicating one or more subsequent beamformed transmissions with the second wireless station based on the first beamforming training and communicating the one or more subsequent beamformed transmissions with the second wireless station based on the second beamforming training.

Example 105 includes the subject matter of Example 104, and optionally, comprising communicating the one or more subsequent beamformed transmissions with the second wireless station based on the first beamforming training, when the transition indicator comprises a no-transition indication to indicate that beamformed communication is to be maintained via the first sectorized antenna subsequent to the second beamforming training.

Example 106 includes the subject matter of Example 104, and optionally, comprising communicating the one or more subsequent beamformed transmissions with the second wireless station based on the second beamforming training, when the transition indicator comprises a transition indication to indicate a transition from the first sectorized antenna to the second sectorized antenna.

Example 107 includes the subject matter of any one of Examples 104-106, and optionally, comprising processing a Sector Sweep (SSW) Acknowledgement (Ack) frame comprising the transition indicator.

Example 108 includes the subject matter of any one of Examples 104-106, and optionally, comprising processing a Beamforming Refinement Phase (BRP) frame comprising the transition indicator.

Example 109 includes the subject matter of any one of Examples 102-108, and optionally, comprising transmitting the second frame to the second wireless station to initiate the second beamforming training with the second sectorized antenna of the second wireless station.

Example 110 includes the subject matter of any one of Examples 102-108, and optionally, comprising processing the second frame received from the second wireless station.

Example 111 includes the subject matter of any one of Examples 102-110, and optionally, wherein the second frame comprises a timing to initiate the second beamforming training.

Example 112 includes the subject matter of Example 111, and optionally, wherein the second frame comprises a neighbor report element comprising a neighbor field, and a timing field, the neighbor field comprising the second ID of the second sectorized antenna, and the timing field comprising an indication of the timing to initiate the second beamforming training.

Example 113 includes the subject matter of any one of Examples 102-112, and optionally, wherein the second frame comprises a beamforming training frame.

Example 114 includes the subject matter of any one of Examples 102-113, and optionally, wherein the second frame comprises a beacon frame, a Sector Sweep (SSW) frame, or a Beamforming Refinement Phase (BRP) frame.

Example 115 includes the subject matter of any one of Examples 102-114, and optionally, wherein the second wireless station comprises an Access Point (AP).

Example 116 includes a product including one or more tangible computer-readable non-transitory storage media comprising computer-executable instructions operable to, when executed by at least one computer processor, enable the at least one computer processor to implement operations at a first wireless station, the operations comprising during a first beamforming training with a second wireless station, communicating one or more first frames with a first sectorized antenna of a plurality of sectorized antennas of the second wireless station, the first frames comprising a first Identifier (ID) of the first sectorized antenna; communicating one or more beamformed transmissions with the second wireless station based on the first beamforming training; communicating a second frame with the second wireless station, the second frame comprising a second ID of a second sectorized antenna of the plurality of sectorized antennas of the second wireless station; and based on the second frame, performing a second beamforming training between the first wireless station and the second sectorized antenna of the second wireless station.

Example 117 includes the subject matter of Example 116, and optionally, wherein the operations comprise communicating one or more subsequent beamformed transmissions with the second sectorized antenna of the second wireless station based on the second beamforming training.

Example 118 includes the subject matter of Example 116 or 117, and optionally, wherein the operations comprise processing a beamforming training frame of the second beamforming training comprising a transition indicator to indicate whether or not the second wireless station is to transition from the first sectorized antenna to the second sectorized antenna, and, based on the transition indicator, selecting between communicating one or more subsequent beamformed transmissions with the second wireless station based on the first beamforming training and communicating the one or more subsequent beamformed transmissions with the second wireless station based on the second beamforming training.

Example 119 includes the subject matter of Example 118, and optionally, wherein the operations comprise communicating the one or more subsequent beamformed transmissions with the second wireless station based on the first beamforming training, when the transition indicator comprises a no-transition indication to indicate that beamformed communication is to be maintained via the first sectorized antenna subsequent to the second beamforming training.

Example 120 includes the subject matter of Example 118, and optionally, wherein the operations comprise communicating the one or more subsequent beamformed transmissions with the second wireless station based on the second beamforming training, when the transition indicator comprises a transition indication to indicate a transition from the first sectorized antenna to the second sectorized antenna.

Example 121 includes the subject matter of any one of Examples 118-120, and optionally, wherein the operations comprise processing a Sector Sweep (SSW) Acknowledgement (Ack) frame comprising the transition indicator.

Example 122 includes the subject matter of any one of Examples 118-120, and optionally, wherein the operations comprise processing a Beamforming Refinement Phase (BRP) frame comprising the transition indicator.

Example 123 includes the subject matter of any one of Examples 116-122, and optionally, wherein the operations comprise transmitting the second frame to the second wireless station to initiate the second beamforming training with the second sectorized antenna of the second wireless station.

Example 124 includes the subject matter of any one of Examples 116-122, and optionally, wherein the operations comprise processing the second frame received from the second wireless station.

Example 125 includes the subject matter of any one of Examples 116-124, and optionally, wherein the second frame comprises a timing to initiate the second beamforming training.

Example 126 includes the subject matter of Example 125, and optionally, wherein the second frame comprises a neighbor report element comprising a neighbor field, and a timing field, the neighbor field comprising the second ID of the second sectorized antenna, and the timing field comprising an indication of the timing to initiate the second beamforming training.

Example 127 includes the subject matter of any one of Examples 116-126, and optionally, wherein the second frame comprises a beamforming training frame.

Example 128 includes the subject matter of any one of Examples 116-127, and optionally, wherein the second frame comprises a beacon frame, a Sector Sweep (SSW) frame, or a Beamforming Refinement Phase (BRP) frame.

Example 129 includes the subject matter of any one of Examples 116-128, and optionally, wherein the second wireless station comprises an Access Point (AP).

Example 130 includes an apparatus of wireless communication by a first wireless station, the apparatus comprising means for, during a first beamforming training with a second wireless station, communicating one or more first frames with a first sectorized antenna of a plurality of sectorized antennas of the second wireless station, the first frames comprising a first Identifier (ID) of the first sectorized antenna; means for communicating one or more beamformed transmissions with the second wireless station based on the first beamforming training; means for communicating a second frame with the second wireless station, the second frame comprising a second ID of a second sectorized antenna of the plurality of sectorized antennas of the second wireless station; and means for, based on the second frame, performing a second beamforming training between the first wireless station and the second sectorized antenna of the second wireless station.

Example 131 includes the subject matter of Example 130, and optionally, comprising means for communicating one or more subsequent beamformed transmissions with the second sectorized antenna of the second wireless station based on the second beamforming training.

Example 132 includes the subject matter of Example 130 or 131, and optionally, comprising means for processing a beamforming training frame of the second beamforming training comprising a transition indicator to indicate whether or not the second wireless station is to transition from the first sectorized antenna to the second sectorized antenna, and, based on the transition indicator, selecting between communicating one or more subsequent beamformed transmissions with the second wireless station based on the first beamforming training and communicating the one or more subsequent beamformed transmissions with the second wireless station based on the second beamforming training.

Example 133 includes the subject matter of Example 132, and optionally, comprising means for communicating the one or more subsequent beamformed transmissions with the second wireless station based on the first beamforming training, when the transition indicator comprises a no-transition indication to indicate that beamformed communication is to be maintained via the first sectorized antenna subsequent to the second beamforming training.

Example 134 includes the subject matter of Example 132, and optionally, comprising means for communicating the one or more subsequent beamformed transmissions with the second wireless station based on the second beamforming training, when the transition indicator comprises a transition indication to indicate a transition from the first sectorized antenna to the second sectorized antenna.

Example 135 includes the subject matter of any one of Examples 132-134, and optionally, comprising means for processing a Sector Sweep (SSW) Acknowledgement (Ack) frame comprising the transition indicator.

Example 136 includes the subject matter of any one of Examples 132-134, and optionally, comprising means for processing a Beamforming Refinement Phase (BRP) frame comprising the transition indicator.

Example 137 includes the subject matter of any one of Examples 130-136, and optionally, comprising means for transmitting the second frame to the second wireless station to initiate the second beamforming training with the second sectorized antenna of the second wireless station.

Example 138 includes the subject matter of any one of Examples 130-136, and optionally, comprising means for processing the second frame received from the second wireless station.

Example 139 includes the subject matter of any one of Examples 130-138, and optionally, wherein the second frame comprises a timing to initiate the second beamforming training.

Example 140 includes the subject matter of Example 139, and optionally, wherein the second frame comprises a neighbor report element comprising a neighbor field, and a timing field, the neighbor field comprising the second ID of the second sectorized antenna, and the timing field comprising an indication of the timing to initiate the second beamforming training.

Example 141 includes the subject matter of any one of Examples 130-140, and optionally, wherein the second frame comprises a beamforming training frame.

Example 142 includes the subject matter of any one of Examples 130-141, and optionally, wherein the second frame comprises a beacon frame, a Sector Sweep (SSW) frame, or a Beamforming Refinement Phase (BRP) frame.

Example 143 includes the subject matter of any one of Examples 130-142, and optionally, wherein the second wireless station comprises an Access Point (AP).

Functions, operations, components and/or features described herein with reference to one or more embodiments, may be combined with, or may be utilized in combination with, one or more other functions, operations, components and/or features described herein with reference to one or more other embodiments, or vice versa.

While certain features have been illustrated and described herein, many modifications, substitutions, changes, and equivalents may occur to those skilled in the art. It is, therefore, to be understood that the appended claims are intended to cover all such modifications and changes as fall within the true spirit of the disclosure.

What is claimed is:

1. An apparatus comprising circuitry and logic configured to cause a first wireless station to:
   during a first beamforming training with a second wireless station, communicate one or more first frames with the second wireless station via a first sectorized antenna of a plurality of sectorized antennas of the first wireless station, the first frames comprising a first Identifier (ID) of the first sectorized antenna;
   communicate one or more beamformed transmissions with the second wireless station based on the first beamforming training;
   communicate a second frame with the second wireless station via a second sectorized antenna of the plurality of sectorized antennas of the first wireless station, the second frame to initiate a second beamforming training between the second sectorized antenna and the second wireless station, the second frame comprising a second ID of the second sectorized antenna; and
   communicate a beamforming training frame of the second beamforming training comprising a transition indicator to indicate whether or not the first wireless station is to transition from the first sectorized antenna to the second sectorized antenna.

2. The apparatus of claim 1 configured to cause the first wireless station to communicate one or more subsequent beamformed transmissions with the second wireless station via the second sectorized antenna based on the second beamforming training.

3. The apparatus of claim 1, wherein the first wireless station comprises an Access Point (AP).

4. The apparatus of claim 1 configured to cause the first wireless station to communicate the beamforming training frame comprising the transition indicator comprising a no-transition indication to indicate that beamformed communication is to be maintained via the first sectorized antenna subsequent to the second beamforming training.

5. The apparatus of claim 1 configured to cause the first wireless station to communicate the beamforming training frame comprising the transition indicator comprising a transition indication to indicate a transition from the first sectorized antenna to the second sectorized antenna.

6. The apparatus of claim 1 configured to cause the first wireless station to communicate a Sector Sweep (SSW) Acknowledgement (Ack) frame comprising the transition indicator.

7. The apparatus of claim 1 configured to cause the first wireless station to communicate a Beamforming Refinement Phase (BRP) frame comprising the transition indicator.

8. The apparatus of claim 1 configured to cause the first wireless station to transmit the second frame to the second wireless station to initiate the second beamforming training between the second sectorized antenna of the first wireless station and the second wireless station.

9. The apparatus of claim 1 configured to cause the first wireless station to process the second frame received from the second wireless station.

10. The apparatus of claim 1, wherein the second frame comprises a timing to initiate the second beamforming training.

11. The apparatus of claim 10, wherein the second frame comprises a neighbor report element comprising a neighbor field, and a timing field, the neighbor field comprising the second ID of the second sectorized antenna, and the timing field comprising an indication of the timing to initiate the second beamforming training.

12. The apparatus of claim 1 comprising a radio, a memory and a processor.

13. A product including one or more tangible computer-readable non-transitory storage media comprising computer-executable instructions operable to, when executed by at least one processor, enable the at least one processor to cause a first wireless station to:

during a first beamforming training with a second wireless station, communicate one or more first frames with the second wireless station via a first sectorized antenna of a plurality of sectorized antennas of the first wireless station, the first frames comprising a first Identifier (ID) of the first sectorized antenna;

communicate one or more beamformed transmissions with the second wireless station based on the first beamforming training;

communicate a second frame with the second wireless station via a second sectorized antenna of the plurality of sectorized antennas of the first wireless station, the second frame to initiate a second beamforming training between the second sectorized antenna and the second wireless station, the second frame comprising a second ID of the second sectorized antenna; and communicate a beamforming training frame of the second beamforming training comprising a transition indicator to indicate whether or not the first wireless station is to transition from the first sectorized antenna to the second sectorized antenna.

14. The product of claim 13, wherein the instructions, when executed, cause the first wireless station to communicate one or more subsequent beamformed transmissions with the second wireless station via the second sectorized antenna based on the second beamforming training.

15. The product of claim 13, wherein the second frame comprises a timing to initiate the second beamforming training.

16. An apparatus comprising circuitry and logic configured to cause a first wireless station to:

during a first beamforming training with a second wireless station, communicate one or more first frames with a first sectorized antenna of a plurality of sectorized antennas of the second wireless station, the first frames comprising a first Identifier (ID) of the first sectorized antenna;

communicate one or more beamformed transmissions with the second wireless station based on the first beamforming training;

communicate a second frame with the second wireless station, the second frame comprising a second ID of a second sectorized antenna of the plurality of sectorized antennas of the second wireless station;

based on the second frame, perform a second beamforming training between the first wireless station and the second sectorized antenna of the second wireless station;

process a beamforming training frame of the second beamforming training comprising a transition indicator to indicate whether or not the second wireless station is to transition from the first sectorized antenna to the second sectorized antenna; and based on the transition indicator, select between communicating one or more subsequent beamformed transmissions with the second wireless station based on the first beamforming training and communicating the one or more subsequent beamformed transmissions with the second wireless station based on the second beamforming training.

17. The apparatus of claim 16 configured to cause the first wireless station to communicate the one or more subsequent beamformed transmissions with the second sectorized antenna of the second wireless station based on the second beamforming training.

18. The apparatus of claim 16 configured to cause the first wireless station to process a Sector Sweep (SSW) Acknowledgement (Ack) frame comprising the transition indicator.

19. The apparatus of claim 16 configured to cause the first wireless station to communicate the one or more subsequent beamformed transmissions with the second wireless station based on the first beamforming training, when the transition indicator comprises a no-transition indication to indicate that beamformed communication is to be maintained via the first sectorized antenna subsequent to the second beamforming training.

20. The apparatus of claim 16 configured to cause the first wireless station to communicate the one or more subsequent beamformed transmissions with the second wireless station based on the second beamforming training, when the transition indicator comprises a transition indication to indicate a transition from the first sectorized antenna to the second sectorized antenna.

21. The apparatus of claim 16 configured to cause the first wireless station to transmit the second frame to the second wireless station to initiate the second beamforming training with the second sectorized antenna of the second wireless station.

22. The apparatus of claim 16 configured to cause the first wireless station to process the second frame received from the second wireless station.

23. The apparatus of claim 16 comprising one or more antennas, a radio, a memory and a processor.

24. A product including one or more tangible computer-readable non-transitory storage media comprising computer-executable instructions operable to, when executed by at least one processor, enable the at least one processor to cause a first wireless station to:

during a first beamforming training with a second wireless station, communicate one or more first frames with a first sectorized antenna of a plurality of sectorized antennas of the second wireless station, the first frames comprising a first Identifier (ID) of the first sectorized antenna;

communicate one or more beamformed transmissions with the second wireless station based on the first beamforming training;

communicate a second frame with the second wireless station, the second frame comprising a second ID of a second sectorized antenna of the plurality of sectorized antennas of the second wireless station;

based on the second frame, perform a second beamforming training between the first wireless station and the second sectorized antenna of the second wireless station;

process a beamforming training frame of the second beamforming training comprising a transition indicator to indicate whether or not the second wireless station is to transition from the first sectorized antenna to the second sectorized antenna; and based on the transition indicator, select between communicating one or more subsequent beamformed transmissions with the second wireless station based on the first beamforming training and communicating the one or more subsequent beamformed transmissions with the second wireless station based on the second beamforming training.

25. The product of claim 24, wherein the instructions, when executed, cause the first wireless station to communicate the one or more subsequent beamformed transmissions with the second wireless station based on the first beamforming training, when the transition indicator comprises a no-transition indication to indicate that beamformed communication is to be maintained via the first sectorized antenna subsequent to the second beamforming training.

* * * * *